US006886362B2

(12) United States Patent
Wilding et al.

(10) Patent No.: US 6,886,362 B2
(45) Date of Patent: May 3, 2005

(54) APPARATUS FOR THE LIQUEFACTION OF NATURAL GAS AND METHODS RELATING TO SAME

(75) Inventors: Bruce M. Wilding, Idaho Falls, ID (US); Dennis N. Bingham, Idaho Falls, ID (US); Michael G. McKellar, Idaho Falls, ID (US); Terry D. Turner, Ammon, ID (US); Kevin T. Raterman, Idaho Falls, ID (US); Gary L. Palmer, Shelley, ID (US); Kerry M. Klingler, Idaho Falls, ID (US); John J. Vranicar, Concord, CA (US)

(73) Assignee: Bechtel BWXT Idaho LLC, Idaho Falls, ID (US)

( * ) Notice: Subject to any disclaimer, the term of this patent is extended or adjusted under 35 U.S.C. 154(b) by 38 days.

(21) Appl. No.: 10/414,883

(22) Filed: Apr. 14, 2003

(65) Prior Publication Data

US 2003/0196452 A1 Oct. 23, 2003

Related U.S. Application Data

(62) Division of application No. 10/086,066, filed on Feb. 27, 2002, now Pat. No. 6,581,409.
(60) Provisional application No. 60/288,985, filed on May 4, 2001.

(51) Int. Cl.[7] ............................. F25J 1/00; F25J 5/00; F28F 27/02; F28F 7/00; F28F 9/22
(52) U.S. Cl. ........................ 62/613; 62/904; 165/103; 165/139; 165/145
(58) Field of Search .................... 62/613, 903, 904; 165/157, 159, 163, 103, 139, 145

(56) References Cited

U.S. PATENT DOCUMENTS 336,173 A 2/1886 Ludwog Kniel 1,222,801 A * 4/1917 Rosenbaum ................ 165/145
2,209,534 A 7/1940 Moore (Continued)

FOREIGN PATENT DOCUMENTS

| JP | 2002071861 A | 3/2002 |
| WO | WO 88/00936 | 2/1988 |

OTHER PUBLICATIONS

Curtin University of Technology, LNG Microcell Progress Update May 2002, Curtin/Corelab.

Holmes et al., *Ryan/Holmes Cryogenic Acid Gas/Hydrocarbon Separations Provide Economic Benefits for LNG Production*, 7th International Conference on Liquefied Natural Gas; Jakarta, Indonesia; May 1983; Institute of Gas Technology, Session II, vol. 1, pp. 1–15.

*Primary Examiner*—William C. Doerrler
(74) *Attorney, Agent, or Firm*—Trask Britt PC

(57) ABSTRACT

An apparatus and method for producing liquefied natural gas. A liquefaction plant may be coupled to a source of unpurified natural gas, such as a natural gas pipeline at a pressure letdown station. A portion of the gas is drawn off and split into a process stream and a cooling stream. The cooling stream passes through a turbo expander creating work output. A compressor is driven by the work output and compresses the process stream. The compressed process stream is cooled, such as by the expanded cooling stream. The cooled, compressed process stream is divided into first and second portions with the first portion being expanded to liquefy the natural gas. A gas-liquid separator separates the vapor from the liquid natural gas. The second portion of the cooled, compressed process stream is also expanded and used to cool the compressed process stream. Additional features and techniques may be integrated with the liquefaction process including a water clean-up cycle and a carbon dioxide ($CO_2$) clean-up cycle.

20 Claims, 17 Drawing Sheets

U.S. PATENT DOCUMENTS

| | | | |
|---|---|---|---|
| 2,494,120 A | 10/1950 | Ferro, Jr. | |
| 2,900,797 A | 8/1959 | Kurata et al. | |
| 2,937,503 A | 5/1960 | Swearingen et al. | |
| 3,132,016 A | 5/1964 | Kurata | |
| 3,168,136 A | * 2/1965 | Ammon | 165/70 |
| 3,193,468 A | * 7/1965 | Sprague | 376/378 |
| 3,236,057 A | 2/1966 | Hashemi-Tafreshi | |
| 3,292,380 A | 12/1966 | Bucklin | |
| 3,315,475 A | 4/1967 | Harmens | |
| 3,323,315 A | 6/1967 | Carr | |
| 3,349,020 A | 10/1967 | Crownover et al. | |
| 3,416,324 A | 12/1968 | Swearingen | |
| 3,422,887 A | * 1/1969 | Berkeley | 165/113 |
| 3,448,587 A | 6/1969 | Goard et al. | |
| 3,487,652 A | 1/1970 | McKay | |
| 3,548,606 A | 12/1970 | Kuerston | |
| 3,596,473 A | 8/1971 | Streich | |
| 3,608,323 A | 9/1971 | Salama | |
| 3,628,340 A | 12/1971 | Meisler et al. | |
| 3,677,019 A | 7/1972 | Olszewski | |
| 3,724,225 A | 4/1973 | Mancini et al. | |
| 3,724,226 A | 4/1973 | Pachalay | |
| 3,735,600 A | 5/1973 | Dowdell et al. | |
| 4,001,116 A | 1/1977 | Selcukoglu | |
| 4,120,911 A | 10/1978 | Davidson | |
| 4,128,410 A | 12/1978 | Bacon | |
| 4,187,689 A | 2/1980 | Selcukoglu et al. | |
| 4,318,723 A | 3/1982 | Holmes et al. | |
| 4,334,902 A | 6/1982 | Paradowski | |
| 4,359,871 A | 11/1982 | Strass | |
| 4,453,956 A | 6/1984 | Fabbri et al. | |
| 4,479,533 A | * 10/1984 | Persson et al. | 165/140 |
| 4,479,536 A | * 10/1984 | Lameris | 165/145 |
| 4,561,496 A | * 12/1985 | Kehrer | 165/103 |
| 4,609,390 A | 9/1986 | Wilson | |
| 4,611,655 A | * 9/1986 | Molignoni | 165/163 |
| 4,654,522 A | 3/1987 | Gornick et al. | |
| 4,798,242 A | * 1/1989 | Kito et al. | 165/103 |
| 4,846,862 A | 7/1989 | Cook | |
| 4,970,867 A | 11/1990 | Herron et al. | |
| 5,062,270 A | 11/1991 | Haut et al. | |
| 5,291,736 A | 3/1994 | Paradowski | |
| 5,327,730 A | 7/1994 | Myers et al. | |
| 5,375,422 A | 12/1994 | Butts | |
| 5,379,832 A | * 1/1995 | Dempsey | 165/110 |
| 5,386,699 A | 2/1995 | Myers et al. | |
| 5,390,499 A | 2/1995 | Rhoades et al. | |
| 5,450,728 A | 9/1995 | Vora et al. | |
| 5,505,048 A | 4/1996 | Ha et al. | |
| 5,505,232 A | 4/1996 | Barclay | |
| 5,511,382 A | 4/1996 | Denis et al. | |
| 5,537,827 A | 7/1996 | Low et al. | |
| 5,551,256 A | 9/1996 | Schmidt | |
| 5,600,969 A | 2/1997 | Low | |
| 5,615,561 A | 4/1997 | Houshmand et al. | |
| 5,615,738 A | * 4/1997 | Cameron et al. | 165/103 |
| 5,655,388 A | 8/1997 | Bonaquist et al. | |
| 5,669,234 A | 9/1997 | Houser et al. | |
| 5,718,126 A | 2/1998 | Capron et al. | |
| 5,755,114 A | 5/1998 | Foglietta | |
| 5,755,280 A | * 5/1998 | da Costa et al. | 165/140 |
| 5,799,505 A | 9/1998 | Bonaquist et al. | |
| 5,819,555 A | 10/1998 | Engdahl | |
| 5,836,173 A | 11/1998 | Lynch et al. | |
| 5,956,971 A | 9/1999 | Cole et al. | |
| 5,983,665 A | 11/1999 | Howard et al. | |
| 6,085,546 A | 7/2000 | Johnston | |
| 6,085,547 A | 7/2000 | Johnston | |
| 6,105,390 A | 8/2000 | Bingham et al. | |
| 6,131,395 A | 10/2000 | Greene et al. | |
| 6,131,407 A | 10/2000 | Wissolik | |
| 6,138,473 A | 10/2000 | Boyer-Vidal | |
| 6,138,746 A | * 10/2000 | Livolsi et al. | 165/145 |
| 6,220,052 B1 | 4/2001 | Tate, Jr. et al. | |
| 6,250,244 B1 | 6/2001 | Dubar et al. | |
| 6,378,330 B1 | 4/2002 | Minta et al. | |
| 6,382,310 B1 | 5/2002 | Smith | |
| 6,400,896 B1 | 6/2002 | Longardner | |
| 6,581,510 B2 | * 6/2003 | Koch et al. | 99/348 |

* cited by examiner

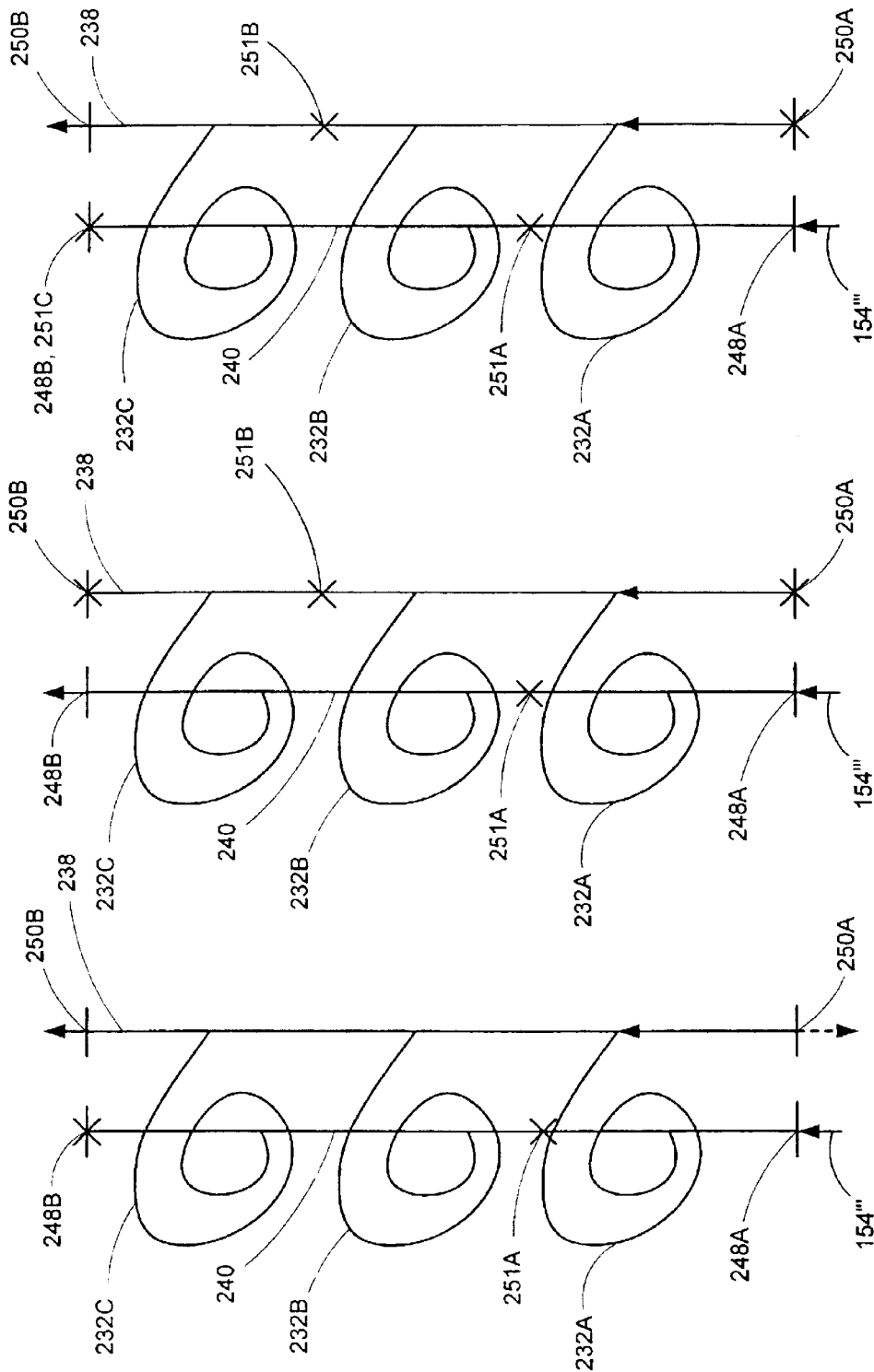

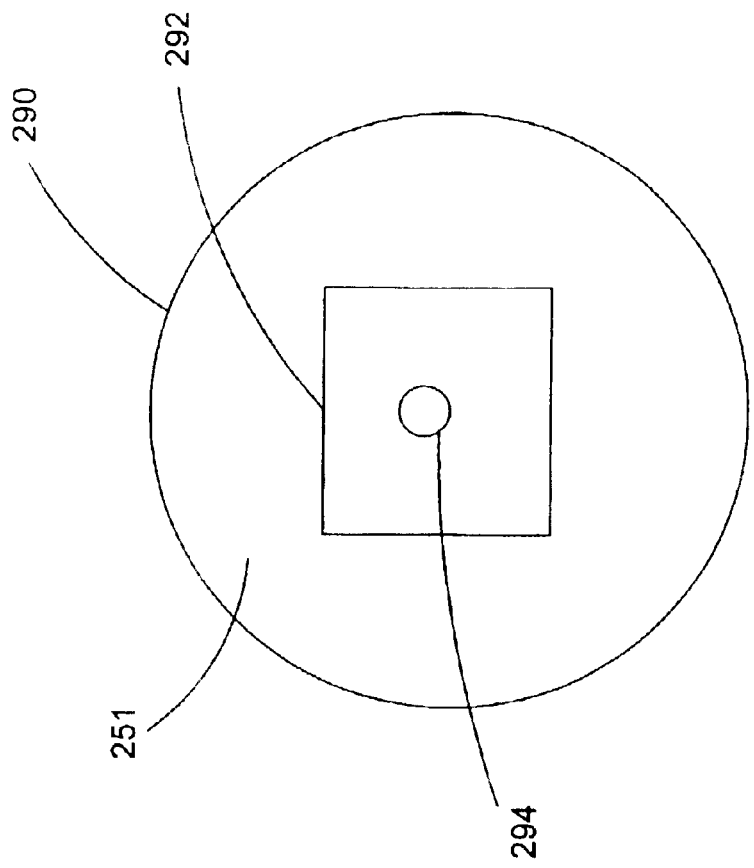
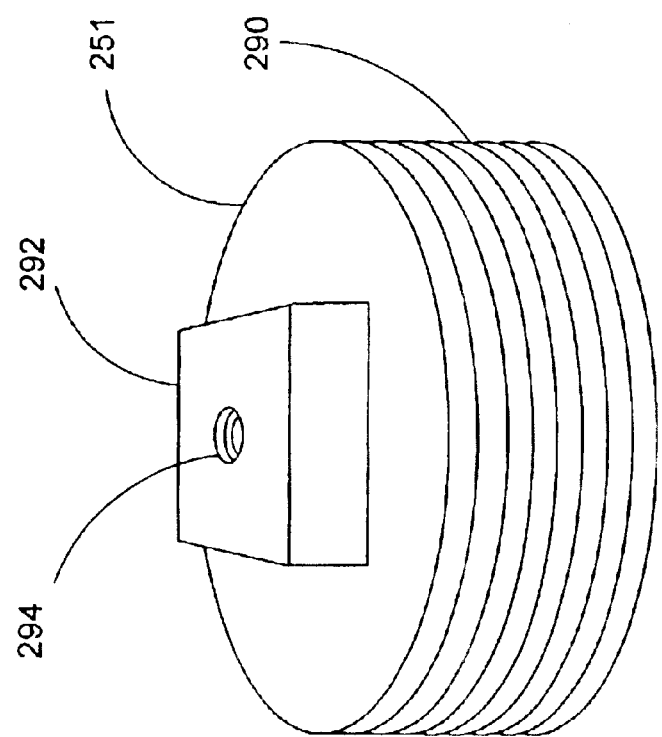
FIG. 8B
FIG. 8A

APPARATUS FOR THE LIQUEFACTION OF NATURAL GAS AND METHODS RELATING TO SAME

CROSS REFERENCE TO RELATED APPLICATIONS

This application is a Divisional application of patent application Ser. No. 10/086,066, filed Feb. 27, 2002, now U.S. Pat. No. 6,581,409 issued Jun. 24, 2003 for Apparatus for the Liquefaction of Natural Gas and Methods Relating to Same, which claims priority to U.S. Provisional Application Serial No. 60/288,985 filed May 4, 2001.

GOVERNMENT RIGHTS

The United States Government has rights in the following invention pursuant to Contract No. DE-AC07–99ID13727 between the U.S. Department of Energy and Bechtel BWXT Idaho, LLC.

BACKGROUND OF THE INVENTION

1. Field of the Invention

The present invention relates generally to the compression and liquefaction of gases, and more particularly to the partial liquefaction of a gas, such as natural gas, on a small scale by utilizing a combined refrigerant and expansion process.

2. State of the Art

Natural gas is a known alternative to combustion fuels such as gasoline and diesel. Much effort has gone into the development of natural gas as an alternative combustion fuel in order to combat various drawbacks of gasoline and diesel including production costs and the subsequent emissions created by the use thereof. As is known in the art, natural gas is a cleaner burning fuel than other combustion fuels. Additionally, natural gas is considered to be safer than gasoline or diesel as natural gas will rise in the air and dissipate, rather than settling.

To be used as an alternative combustion fuel, natural gas (also termed "feed gas" herein) is conventionally converted into compressed natural gas (CNG) or liquified (or liquid) natural gas (LNG) for purposes of storing and transporting the fuel prior to its use. Conventionally, two of the known basic cycles for the liquefaction of natural gases are referred to as the "cascade cycle" and the "expansion cycle."

Briefly, the cascade cycle consists of a series of heat exchanges with the feed gas, each exchange being at successively lower temperatures until the desired liquefaction is accomplished. The levels of refrigeration are obtained with different refrigerants or with the same refrigerant at different evaporating pressures. The cascade cycle is considered to be very efficient at producing LNG as operating costs are relatively low. However, the efficiency in operation is often seen to be offset by the relatively high investment costs associated with the expensive heat exchange and the compression equipment associated with the refrigerant system. Additionally, a liquefaction plant incorporating such a system may be impractical where physical space is limited, as the physical components used in cascading systems are relatively large.

In an expansion cycle, gas is conventionally compressed to a selected pressure, cooled, then allowed to expand through an expansion turbine, thereby producing work as well as reducing the temperature of the feed gas. The low temperature feed gas is then heat exchanged to effect liquefaction of the feed gas. Conventionally, such a cycle has been seen as being impracticable in the liquefaction of natural gas since there is no provision for handling some of the components present in natural gas which freeze at the temperatures encountered in the heat exchangers, for example, water and carbon dioxide.

Additionally, to make the operation of conventional systems cost effective, such systems are conventionally built on a large scale to handle large volumes of natural gas. As a result, fewer facilities are built making it more difficult to provide the raw gas to the liquefaction plant or facility as well as making distribution of the liquefied product an issue. Another major problem with large scale facilities is the capital and operating expenses associated therewith. For example, a conventional large scale liquefaction plant, i.e., producing on the order of 70,000 gallons of LNG per day, may cost $2 million to $15 million, or more, in capital expenses. Also, such a plant may require thousands of horsepower to drive the compressors associated with the refrigerant cycles, making operation of the plants expensive.

An additional problem with large facilities is the cost associated with storing large amounts of fuel in anticipation of future use and/or transportation. Not only is there a cost associated with building large storage facilities, but there is also an efficiency issue related therewith as stored LNG will tend to warm and vaporize over time creating a loss of the LNG fuel product. Further, safety may become an issue when larger amounts of LNG fuel product are stored.

In confronting the foregoing issues, various systems have been devised which attempt to produce LNG or CNG from feed gas on a smaller scale, in an effort to eliminate long term storage issues and to reduce the capital and operating expenses associated with the liquefaction and/or compression of natural gas. However, such systems and techniques have all suffered from one or more drawbacks.

U.S. Pat. No. 5,505,232 to Barclay, issued Apr. 9, 1996 is directed to a system for producing LNG and/or CNG. The disclosed system is stated to operate on a small scale producing approximately 1,000 gallons a day of liquefied or compressed fuel product. However, the liquefaction portion of the system itself requires the flow of a "clean" or "purified" gas, meaning that various constituents in the gas such as carbon dioxide, water, or heavy hydrocarbons must be removed before the actual liquefaction process can begin.

Similarly, U.S. Pat. Nos. 6,085,546 and 6,085,547 both issued Jul. 11, 2000 to Johnston, describe methods and systems of producing LNG. The Johnston patents are both directed to small scale production of LNG, but again, both require "prepurification" of the gas in order to implement the actual liquefaction cycle. The need to provide "clean" or "prepurified" gas to the liquefaction cycle is based on the fact that certain gas components might freeze and plug the system during the liquefaction process because of their relatively higher freezing points as compared to methane which makes up the larger portion of natural gas.

Since many sources of natural gas, such as residential or industrial service gas, are considered to be relatively "dirty," the requirement of providing "clean" or "prepurified" gas is actually a requirement of implementing expensive and often complex filtration and purification systems prior to the liquefaction process. This requirement simply adds expense and complexity to the construction and operation of such liquefaction plants or facilities.

In view of the shortcomings in the art, it would be advantageous to provide a process, and a plant for carrying out such a process, of efficiently producing liquefied natural gas on a small scale. More particularly, it would be advantageous to provide a system for producing liquefied natural gas from a source of relatively "dirty" or "unpurified" natural gas without the need for "prepurification." Such a system or process may include various clean-up cycles which are integrated with the liquefaction cycle for purposes of efficiency.

It would be additionally advantageous to provide a plant for the liquefaction of natural gas which is relatively inexpensive to build and operate, and which desirably requires little or no operator oversight.

It would be additionally advantageous to provide such a plant which is easily transportable and which may be located and operated at existing sources of natural gas which are within or near populated communities, thus providing easy access for consumers of LNG fuel.

BRIEF SUMMARY OF THE INVENTION

In accordance with one aspect of the invention, a method is provided for removing carbon dioxide from a mass of natural gas. The method includes cooling at least a portion of the mass of natural gas to form a slurry which comprises at least liquid natural gas and solid carbon dioxide. The slurry is flowed into a hydrocyclone and a thickened slush is formed therein. The thickened slush comprises the solid carbon dioxide and a portion of the liquid natural gas. The thickened slush is discharged through an underflow of the hydrocyclone while the remaining portion of liquid natural gas is flowed through an overflow of the hydrocyclone.

Cooling the portion of the mass of natural gas may be accomplished by expanding the gas, such as through a Joule-Thomson valve. Cooling the portion of the mass of natural gas may also include flowing the gas through a heat exchanger.

The method may also include passing the liquid natural gas through an additional carbon dioxide filter after it exits the overflow of the hydrocyclone.

In accordance with another aspect of the invention, a system is provided for removing carbon dioxide from a mass of natural gas. The system includes a compressor configured to produce a compressed stream of natural gas from at least a portion of the mass of natural gas. At least one heat exchanger receives and cools the compressed stream of natural gas. An expansion valve, or other gas expander, is configured to expand the cooled, compressed stream and form a slurry therefrom, the slurry comprising liquid natural gas and solid carbon dioxide. A hydrocyclone is configured to receive the slurry and separate the slurry into a first portion of liquid natural gas and a thickened slush comprising the solid carbon dioxide and a second portion of the liquid natural gas.

The system may further include additional heat exchangers and gas expanders. Additionally, carbon dioxide filters may be configured to receive the first portion of liquid natural gas for removal of any remaining solid carbon dioxide.

In accordance with another aspect of the invention, a liquefaction plant is provided. The plant includes plant inlet configured to be coupled with a source of natural gas, which may be unpurified natural gas. A turbo expander is configured to receive a first stream of the natural gas drawn through the plant inlet and to produce an expanded cooling stream therefrom. A compressor is mechanically coupled to the turbo expander and configured to receive a second stream of the natural gas drawn through the plant inlet and to produce a compressed process stream therefrom. A first heat exchanger is configured to receive the compressed process stream and the expanded cooling stream in a countercurrent flow arrangement to cool to the compressed process stream. A first plant outlet is configured to be coupled with the source of unpurified gas such that the expanded cooling stream is discharged through the first plant outlet subsequent to passing through the heat exchanger. A first expansion valve is configured to receive and expand a first portion of the cooled compressed process stream and form an additional cooling stream, the additional cooling stream being combined with the expanded cooling stream prior to the expanded cooling stream entering the first heat exchanger. A second expansion valve is configured to receive and expand a second portion of the cooled compressed process stream to form a gas-solid-liquid mixture therefrom. A first gas-liquid separator is configured to receive the gas-solid-liquid mixture. A second plant outlet is configured to be coupled with a storage vessel, the first gas-liquid separator being configured to deliver a liquid contained therein to the second plant outlet.

In accordance with another aspect of the invention, a method of producing liquid natural gas is provided. The method includes providing a source of unpurified natural gas. A portion of the natural gas is flowed from the source and divided into a process stream and a first cooling stream. The first cooling stream is flowed through a turbo expander where work is produced to power a compressor. The process stream is flowed through the compressor and is subsequently cooled by the expanded cooling stream. The cooled, compressed process stream is divided into a product stream and a second cooling stream. The second cooling stream is expanded and combined with the first expanded cooling stream. The product stream is expanded to form a mixture comprising liquid, vapor and solid. The liquid and solid is separated from the vapor, and at least a portion of the liquid is subsequently separated from the liquid-solid mixture.

BRIEF DESCRIPTION OF THE SEVERAL VIEWS OF THE DRAWINGS

The foregoing and other advantages of the invention will become apparent upon reading the following detailed description and upon reference to the drawings in which:

FIGS. 7A through 7C show a schematic of different modes operation of the heat exchanger depicted in FIGS. 5A and 5B according to various embodiments of the invention;

FIGS. 8A and 8B show perspective and elevation view respectively of a plug which may be used in conjunction with the heat exchanger of FIGS. 5A and 5B;

DETAILED DESCRIPTION OF THE INVENTION

Figure 1:
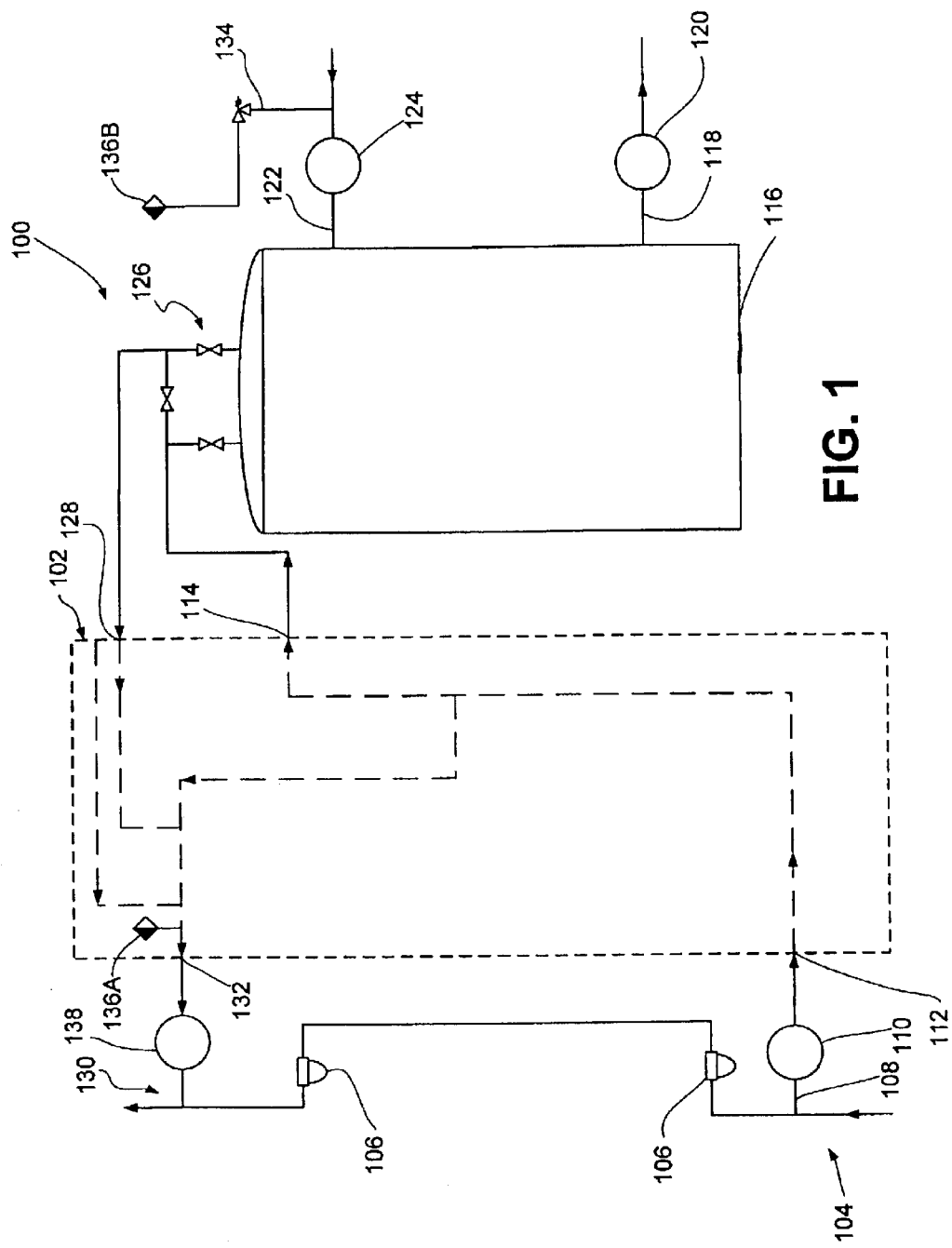
FIG. 1 is a schematic overview of a liquefaction plant according to one embodiment of the present invention.

Referring to FIG. 1, a schematic overview of a portion of a liquefied natural gas (LNG) station 100 is shown according to one embodiment of the present invention. It is noted that, while the present invention is set forth in terms of liquefaction of natural gas, the present invention may be utilized for the liquefaction of other gases as will be appreciated and understood by those of ordinary skill in the art.

The liquefaction station 100 includes a "small scale" natural gas liquefaction plant 102 which is coupled to a source of natural gas such as a pipeline 104, although other sources, such as a well head, are contemplated as being equally suitable. The term "small scale" is used to differentiate from a larger scale plant having the capacity of producing, for example 70,000 gallons of LNG or more per day. In comparison, the presently disclosed liquefaction plant may have capacity of producing, for example, approximately 10,000 gallons of LNG a day but may be scaled for a different output as needed and is not limited to small scale operations or plants. Additionally, as shall be set forth in more detail below, the liquefaction plant 102 of the present invention is considerably smaller in size than a large-scale plant and may be readily transported from one site to another.

One or more pressure regulators 106 are positioned along the pipeline 104 for controlling the pressure of the gas flowing therethrough. Such a configuration is representative of a pressure letdown station wherein the pressure of the natural gas is reduced from the high transmission pressures at an upstream location to a pressure suitable for distribution to one or more customers at a downstream location. Upstream of the pressure regulators 106, for example, the pressure in the pipeline may be approximately 300 to 1000 pounds per square inch absolute (psia) while the pressure downstream of the regulators may be reduced to approximately 65 psia or less. Of course, such pressures are exemplary and may vary depending on the particular pipeline 104 and the needs of the downstream customers. It is further noted that the available pressure of the upstream gas in the pipeline 104 (i.e., at plant entry 112) is not critical as the pressure thereof may be raised, for example by use of an auxiliary booster pump and heat exchanger, prior to the gas entering the liquefaction process described herein.

Prior to any reduction in pressure along the pipeline 104, a stream of feed gas 108 is split off from the pipeline 104 and fed through a flow meter 110 which measures and records the amount of gas flowing therethrough. The stream of feed gas 108 then enters the small scale liquefaction plant 102 through a plant inlet 112 for processing as will be detailed below herein. A portion of the feed gas entering the liquefaction plant 102 becomes LNG and exits the plant 102 at a plant outlet 114 for storage in a suitable tank or vessel 116. The vessel 116 is preferably configured to hold at least 10,000 gallons of LNG at a pressure of approximately 30 to 35 psia and at temperatures as low as approximately −240° F. However, other vessel sizes and configurations may be utilized depending on specific output requirements of the plant 102.

A vessel outlet 118 is coupled to a flow meter 120 in association with dispensing the LNG from the vessel 116, such as to a vehicle which is powered by LNG, or into a transport vehicle as may be required. A vessel inlet 122, coupled with a valve/meter set 124 which could include flow and or process measurement devices, allows for venting and/or purging of a vehicle's tank during dispensing of LNG from the vessel 116. Piping 126 associated with the vessel 116 and connecting with a second plant inlet 128 provides flexibility in controlling the flow of LNG from the liquefaction plant 102 and also allows the flow to be diverted away from the vessel 116, or for drawing vapor from the vessel 116, should conditions ever make such action desirable.

The liquefaction plant 102 is also coupled to a downstream section 130 of the pipeline 104 at a second plant outlet 132 for discharging the portion of natural gas not liquefied during the process conducted within liquefaction plant 102 along with other constituents which may be removed during production of the LNG. Optionally, adjacent the vessel inlet 122, vent piping 134 may be coupled with piping of liquefaction plant 102 as indicated by interface points 136A and 136B. Such vent piping 134 will similarly carry gas into the downstream section 130 of the pipeline 104.

As the various gas components leave the liquefaction plant 102 and enter into the downstream section 130 of the pipeline 104 a valve/meter set 138, which could include flow and/or process measuring devices, may be used to measure the flow of the gas therethrough. The valve/meter sets 124 and 138 as well as the flow meters 110 and 120 may be positioned outside of the plant 102 and/or inside the plant as may be desired. Thus, flow meters 110 and 126, when the outputs thereof are compared, help to determine the net amount of feed gas removed from the pipeline 104 as the upstream flow meter 110 measures the gross amount of gas removed and the downstream flow meter 130 measures the amount of gas placed back into the pipeline 104, the difference being the net amount of feed gas removed from pipeline 104. Similarly, optional flow meters 120 and 124 indicate the net discharge of LNG from the vessel 116.

Figure 2:
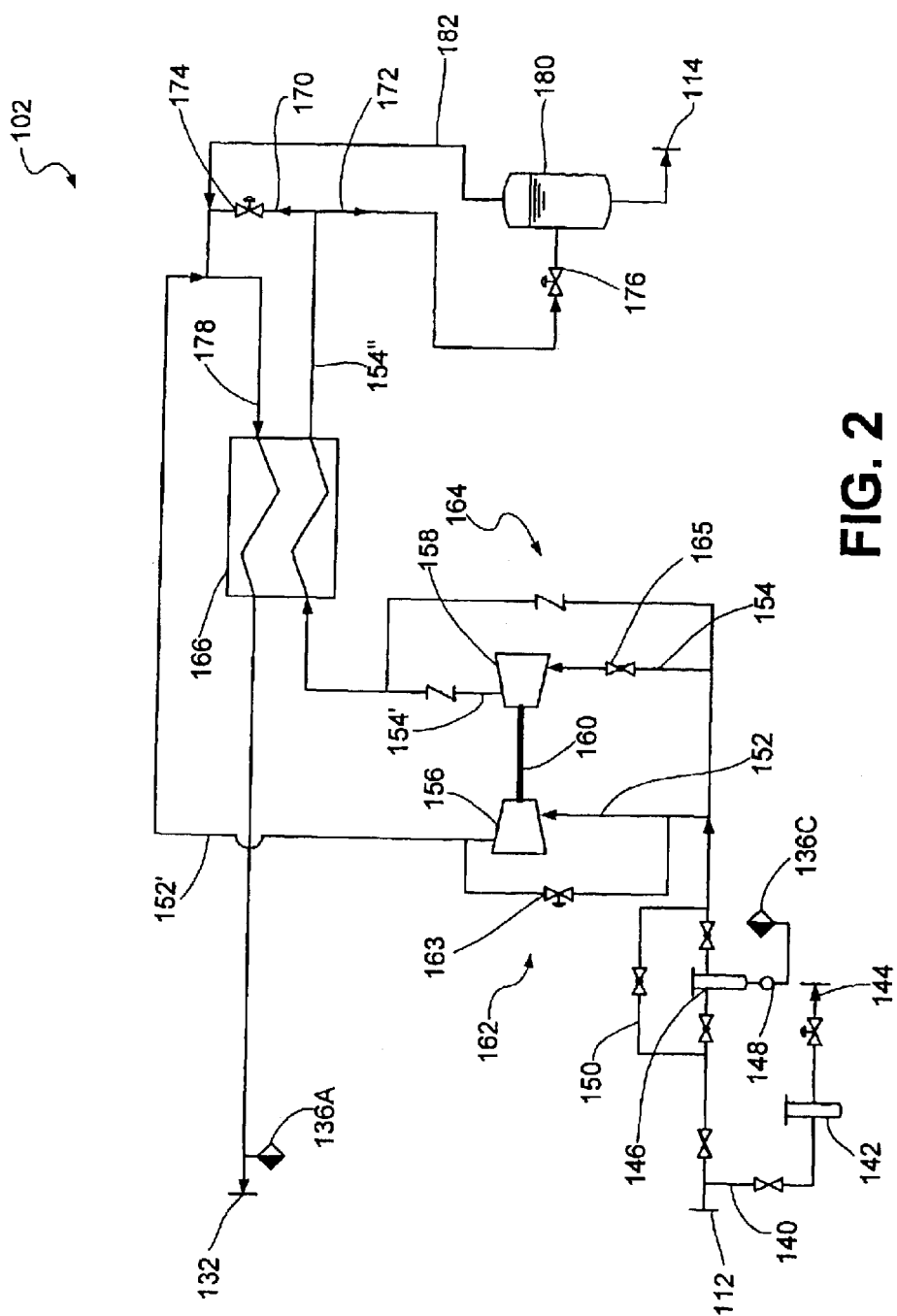
FIG. 2 is a process flow diagram depicting the basic cycle of a liquefaction plant according to one embodiment of the present invention.

Referring now to FIG. 2, a process flow diagram is shown, representative of one embodiment of the liquefaction plant 102 schematically depicted in FIG. 1. As previously indicated with respect to FIG. 1, a high pressure stream of feed gas (i.e., 300 to 1000 psia), for example, at a temperature of approximately 60° F. enters the liquefaction plant 102 through the plant inlet 112. Prior to processing the feed gas, a small portion of feed gas 140 may be split off, passed through a drying filter 142 and utilized as instrument control gas in conjunction with operating and controlling various components in the liquefaction plant 102. While only a single stream 144 of instrument gas is depicted, it will be appreciated by those of skill in the art that multiple lines of instrument gas may be formed in a similar manner.

Alternatively, a separate source of instrument gas, such as, for example, nitrogen, may be provided for controlling various instruments and components within the liquefaction plant 102. As will be appreciated by those of ordinary skill in the art, alternative instrument controls, such as electrical actuation, may likewise be implemented.

Upon entry into the liquefaction plant 102, the feed gas flows through a filter 146 to remove any sizeable objects which might cause damage to, or otherwise obstruct, the flow of gas through the various components of the liquefaction plant 102. The filter 146 may additionally be utilized to remove certain liquid and solid components. For example, the filter 146 may be a coalescing type filter. One exemplary filter is available from Parker Filtration, located in Tewksbury, Mass. and is designed to process approximately 5000 standard cubic feet per minute (SCFM) of natural gas at approximately 60° F. at a pressure of approximately 500 psia.

The filter 146 may be provided with an optional drain 148 which discharges into piping near the plant exit 132, as is indicated by interface connections 136C and 136A, the discharge ultimately reentering the downstream section 130 of the pipeline 104 (see FIG. 1). Bypass piping 150 is routed around the filter 146, allowing the filter 146 to be isolated and serviced as may be required without interrupting the flow of gas through the liquefaction plant 102.

After the feed gas flows through the filter 146 (or alternatively around the filter by way of piping 150) the feed gas is split into two streams, a cooling stream 152 and a process stream 154. The cooling stream 152 passes through a turbo expander 156 and is expanded to an expanded cooling stream 152' exhibiting a lower pressure, for example between atmospheric pressure and approximately 100 psia, at a reduced temperature of approximately 100° F. The turbo expander 156 is a turbine which expands the gas and extracts power from the expansion process. A rotary compressor 158 is coupled to the turbo expander 156 by mechanical means, such as with a shaft 160, and utilizes the power generated by the turbo expander 156 to compress the process stream 154. The proportion of gas in each of the cooling and process lines 152 and 154 is determined by the power requirements of the compressor 158 as well as the flow and pressure drop across the turbo expander 156. Vane control valves within the turbo expander 156 may be used to control the proportion of gas between the cooling and process lines 152 and 154 as is required according to the above stated parameters.

An exemplary turbo expander 156 and compressor 158 system includes a frame size ten (10) system available from GE Rotoflow, located in Gardona, Calif. The expander 156 compressor 158 system is designed to operate at approximately 440 psia at 5,000 pounds mass per hour at about 60° F. The expander/compressor system may also be fitted with magnetic bearings to reduce the footprint of the expander 156 and compressor 158 as well as simplify maintenance thereof.

Bypass piping 162 routes the cooling stream 152 around the turbo expander 156. Likewise, bypass piping 164 routes the process stream 154 around the compressor 158. The bypass piping 162 and 164 may be used during startup to bring certain components to a steady state condition prior to the processing of LNG within the liquefaction plant 102. For example, the bypass piping 162 and 164 allows the heat exchanger 166, and/or other components, to be brought to a steady state temperature without inducing thermal shock. Without bypass piping 162 and 164, thermal shock might result from the immediate flow of gas from the turbo expander 156 and compressor 154. Depending on the design of specific components (i.e., the heat exchanger 166) being used in the liquefaction plant 102, several hours may be required to bring the system to a thermally steady state condition upon start-up of the liquefaction plant 102.

For example, by routing the process stream 154 around the compressor 158, the temperature of the process stream 154 is not increased prior to its introduction into the heat exchanger 166. However, the cooling stream 152, as it bypasses the expander 156, passes through a Joule-Thomson (JT) valve 163 allowing the cooling stream to expand thereby reducing its temperature. The JT valve 163 utilizes the Joule-Thomson principle that expansion of gas will result in an associated cooling of the gas as well, as is understood by those of ordinary skill in the art. The cooling stream 152 may then be used to incrementally reduce the temperature of the heat exchanger 166.

In one embodiment, as discussed in more detail below, the heat exchanger 166 is a high efficiency heat exchanger made from aluminum. In start-up situations it may be desirable to reduce the temperature of such a heat exchanger 166 by as much as 1.8° F. per minute until a defined temperature limit is achieved. During start-up of the liquefaction plant, the temperature of the heat exchanger 166 may be monitored as it incrementally drops. The JT valve 163 and other valving 165 or instruments may be controlled accordingly in order to effect the rate and pressure of flow in the cooling stream 152' and process stream 154' which ultimately controls the cooling rate of heat exchanger 166 and/or other components of the liquefaction plant.

Also, during start-up, it may be desirable to have an amount of LNG already present in the tank 116 (FIG. 1). Some of the cold vapor taken from the LNG present in the tank, or cold vapor or gas from another source, may be cycled through the system in order to cool various components is so desired or deemed necessary. Also, as will become apparent upon reading the additional description below, other cooling devices, including additional JT valves, located in various "loops" or flow streams may likewise be controlled during start-up in order to cool down the heat exchanger 166 or other components of the liquefaction plant 102.

Upon achieving a steady state condition, the process stream 154 is flowed through the compressor 158 which raises the pressure of the process stream 154. An exemplary ratio of the outlet to inlet pressures of a rotary compressor is approximately 1.5 to 2.0, with an average ratio being around 1.7. The compression process is not ideal and, therefore, adds heat to the process stream 154 as it is compressed. To remove heat from the compressed process stream 154' it is flowed through the heat exchanger 166 and is cooled to a very low temperature, for example approximately −200° F. The exemplary heat exchanger 166 depicted in FIG. 2 is a type utilizing countercurrent flow, as is known by those of ordinary skill in the art.

After exiting the heat exchanger 166, the cooled compressed process stream 154" is split into two new streams, a cooling stream 170 and a product stream 172. The cooling stream 170 and the product stream 172 are each expanded through JT valves 174 and 176 respectively. The expansion of the cooling and process streams 170 and 172 through the JT valves 174 and 176 result in a reduced pressure, such as, for example, between atmospheric and approximately 100 psia, and a reduced temperature, for example, of approximately −240° F. The reduced pressure and temperatures will cause the cooling and product streams 170 and 172 to form a mixture of liquid and vapor natural gas.

The cooling stream 170 is combined with the expanded cooling stream 152' exiting the turbo expander 156 to create a combined cooling stream 178. The combined cooling stream 178 is then used to cool the compressed process stream 154' via the heat exchanger 166. After cooling the compressed process stream 154' in the heat exchanger 166, the combined cooling stream 178 may be discharged back into the natural gas pipeline 104 at the downstream section 130 (FIG. 1).

After expansion via the JT valve 176, the product stream 172 enters into a liquid/vapor separator 180. The vapor component from the separator 180 is collected and removed therefrom through piping 182 and added to the combined cooling stream 178 upstream of the heat exchanger 166. The liquid component in the separator is the LNG fuel product and passes through the plant outlet 114 for storage in the vessel 116 (FIG. 1).

By controlling the proportion of gas respectively flowing through the cooling and product streams 170 and 172, the thermodynamics of the process will produce a product stream that has a high liquid fraction. If the liquid fraction is high, i.e., greater than 90%, the methane content in the liquid will be high and the heavy hydrocarbons (ethane, propane, etc.) will be low thus approaching the same composition as the incoming gas stream 112. If the liquid fraction is low, the methane content in the liquid will be low, and the heavy hydrocarbon content in the liquid will be high. The heavy hydrocarbons add more energy content to the fuel, which causes the fuel to burn hotter in combustion processes.

The liquefaction process depicted and described with respect to FIG. 2 provides for low cost, efficient, and effective means of producing LNG when water and/or carbon dioxide are not present in the source gas that is to be subjected to the liquefaction cycle.

Figure 3:
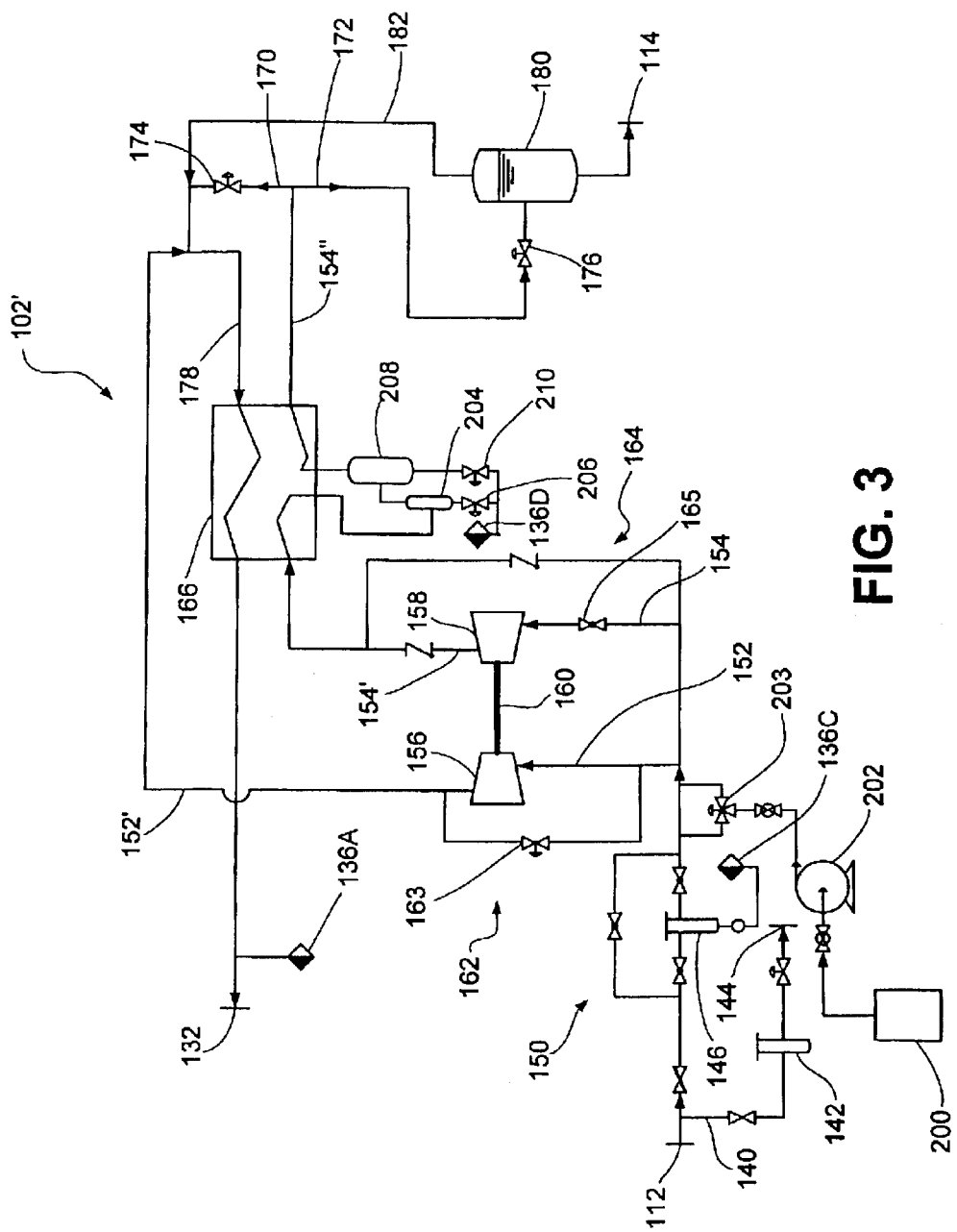
FIG. 3 is a process flow diagram depicting a water clean-up cycle integrated with the liquefaction cycle according an embodiment of the present invention.

Referring now to FIG. 3, a process flow diagram is shown depicting a liquefaction process performed in accordance with another embodiment of a liquefaction plant 102'. As the liquefaction plant 102' and the process carried out thereby share a number of similarities with the plant 102 and process depicted in FIG. 2, like components are identified with like reference numerals for sake of clarity.

Liquefaction plant 102' as shown in FIG. 3 essentially modifies the basic cycle shown in FIG. 2 to allow for removal of water from the natural gas stream during the production of LNG and for prevention of ice formation throughout the system. As illustrated in FIG. 3 the water clean-up cycle includes a source of methanol 200, or some other water absorbing product, which is injected into the gas stream, via a pump 202, at a location prior to the gas being split into the cooling stream 152 and the process stream 154. The pump 202 desirably includes variable flow capability to inject methanol into the gas stream preferably via at least one of an atomizing or a vaporizing nozzle. Alternatively, valving 203 may be used to accommodate multiple types of nozzles such that an appropriate nozzle may be used depending on the flow characteristics of the feed gas. Preferably, a single nozzle is used without valving 203 when water content in the source gas does not significantly flucuate.

A suitable pump 202 for injecting the methanol may include variable flow control in the range of 0.4 to 2.5 gallons per minute (GPM) at a design pressure of approximately 1000 psia for a water content of approximately 2 to 7 pounds mass per millions of standard cubic feet (lbm/mmscf). The variable flow control may be accomplished through the use of a variable frequency drive coupled to a motor of the pump 202. Such an exemplary pump is available from America LEWA located in Holliston, Mass.

The methanol is mixed with the gas stream to lower the freezing point of any water which may be contained therein. The methanol mixes with the gas stream and binds with the water to prevent the formation of ice in the cooling stream 152 during expansion in the turbo expander 156. Additionally, as noted above, the methanol is present in the process stream 154 and passes therewith through the compressor 158. About midway through the heat exchange process (i.e., between approximately −60° F. and −90° F.) the methanol and water form a liquid. The compressed process stream 154' is temporarily diverted from the heat exchanger 166 and passed through a separating tank 204 wherein the methanol/water liquid is separated from the compressed process stream 154', the liquid being discharged through a valve 206 and the gas flowing to a coalescing filter 208 to remove an additional amount of the methanol/water mixture. The methanol/water mixture may be discharged from the coalescing filter 208 through a valve 210 with the dried gas reentering the heat exchanger 166 for further cooling and processing. As is indicated by interface connections 136D and 136A, both valves 206 and 210 discharge the removed methanol/water mixture into piping near the plant exit 132 for discharge into the downstream section 130 of the pipeline 104 (see FIG. 1).

An exemplary coalescing filter 208 used for removing the methanol/water mixture may be designed to process natural gas at approximately −70° F. at flows of approximately 2500 SCFM and at a pressure of approximately 800 psia. Such a filter may exhibit an efficiency of removing the methane/water mixture to less than 75 ppm/w. A suitable filter is available from Parker Filtration, located in Tewksbury, Mass.

The liquefaction process shown in FIG. 3 thus provides for efficient production of natural gas by integrating the removal of water during the process without expensive equipment and preprocessing required prior to the liquefaction cycle, and particularly prior to the expansion of the gas through the turbine expander 156.

Figure 4:
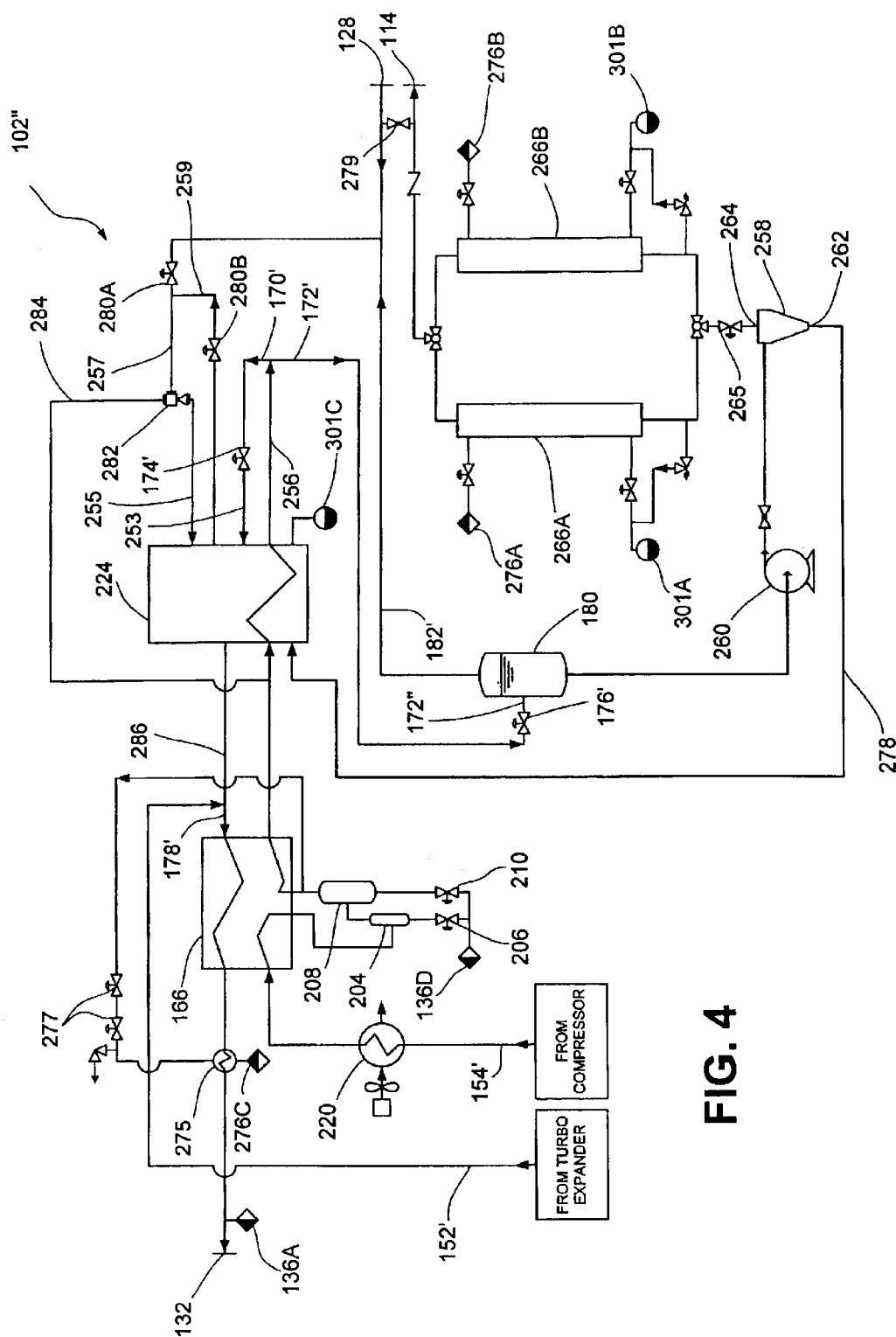
FIG. 4 is a process flow diagram depicting a carbon dioxide clean-up cycle integrated with a liquefaction cycle according an embodiment of the present invention.

Referring now to FIG. 4, a process flow diagram is shown depicting a liquefaction process performed in accordance with another embodiment of the liquefaction plant 102". As the plant 102" and process carried out therein share a number of similarities with plants 102 and 102' and the processes depicted in FIGS. 2 and 3 respectively, like components are again identified with like reference numerals for sake of clarity. Additionally, for sake of clarity, the portion of the cycle between the plant inlet 112 and the expander 156/compressor 158 is omitted in FIG. 4, but may be considered an integral part of the plant 102" and process shown in FIG. 4.

The liquefaction plant 102" shown in FIG. 4 modifies the basic cycle shown in FIG. 2 to incorporate an additional cycle for removing carbon dioxide ($CO_2$) from the natural gas stream during the production of LNG. While the plant 102" and process of FIG. 4 are shown to include the water clean-up cycle described in reference to plant 102' and the process of FIG. 3, the $CO_2$ clean-up cycle is not dependent on the existence of the water clean-up cycle and may be independently integrated with the inventive liquefaction process.

The heat exchange process may be divided among three different heat exchangers 166, 220 and 224. The first heat exchanger 220 in the flow path of the compressed process stream 154' uses ambient conditions, such as, for example, air, water, or ground temperature or a combination thereof, for cooling the compressed process stream 154'. The ambient condition(s) heat exchanger 220 serves to reduce the temperature of the compressed process stream 154' to ensure that the heat generated by the compressor 158 does not thermally damage the high efficiency heat exchanger 166 which sequentially follows the ambient heat exchanger 220.

An exemplary ambient heat exchanger 220 may be designed to process the compressed process stream 154' at approximately 6700 to 6800 lbs mass per hour (lbm/hr) at a design pressure of approximately 800 psia. The heat exchanger 220 may further be configured such that the inlet temperature of the gas is approximately 240° F. and the outlet temperature of the gas is approximately 170° F. with an ambient source temperature (i.e., air temperature, etc.) being approximately 100° F. If such a heat exchanger is provided with a fan, such may be driven by a suitable electric motor.

The high efficiency heat exchanger 166, sequentially following the ambient heat exchanger 220 along the flow path, may be formed as a countercurrent flow, plate and fin type heat exchanger. Additionally, the plates and fins may be formed of a highly thermally conductive material such as, for example, aluminum. The high efficiency heat exchanger 166 is positioned and configured to efficiently transfer as much heat as possible from the compressed process stream 154' to the combined cooling stream 178'. The high efficiency heat exchanger 166 may be configured such that the inlet temperature of the gas will be approximately 170° F. and the outlet temperature of the gas will be approximately −105° F. The liquefaction plant 102' is desirably configured such that temperatures generated within the high efficiency heat exchanger 166 are never low enough to generate solid $CO_2$ which might result in blockage in the flow path of the compressed process stream 154'.

The third heat exchanger 224 sequentially located along the flow path of the process stream is, in part, associated with the processing of solid $CO_2$ removed from the process stream at a later point in the cycle. More specifically, heat exchanger 224 allows the $CO_2$ to be reintroduced into the gas pipeline 104 at the downstream section by subliming the removed solid $CO_2$ in anticipation of its discharge back into the pipeline 104. The sublimation of solid $CO_2$ in heat exchanger 224 helps to prevent damage to, or the plugging of, heat exchanger 166. It is noted that heat exchangers 166 and 224 could be combined if desired. The sublimation of the solid $CO_2$ also serves to further chill the process gas in anticipation of the liquefaction thereof.

Figure 5A:
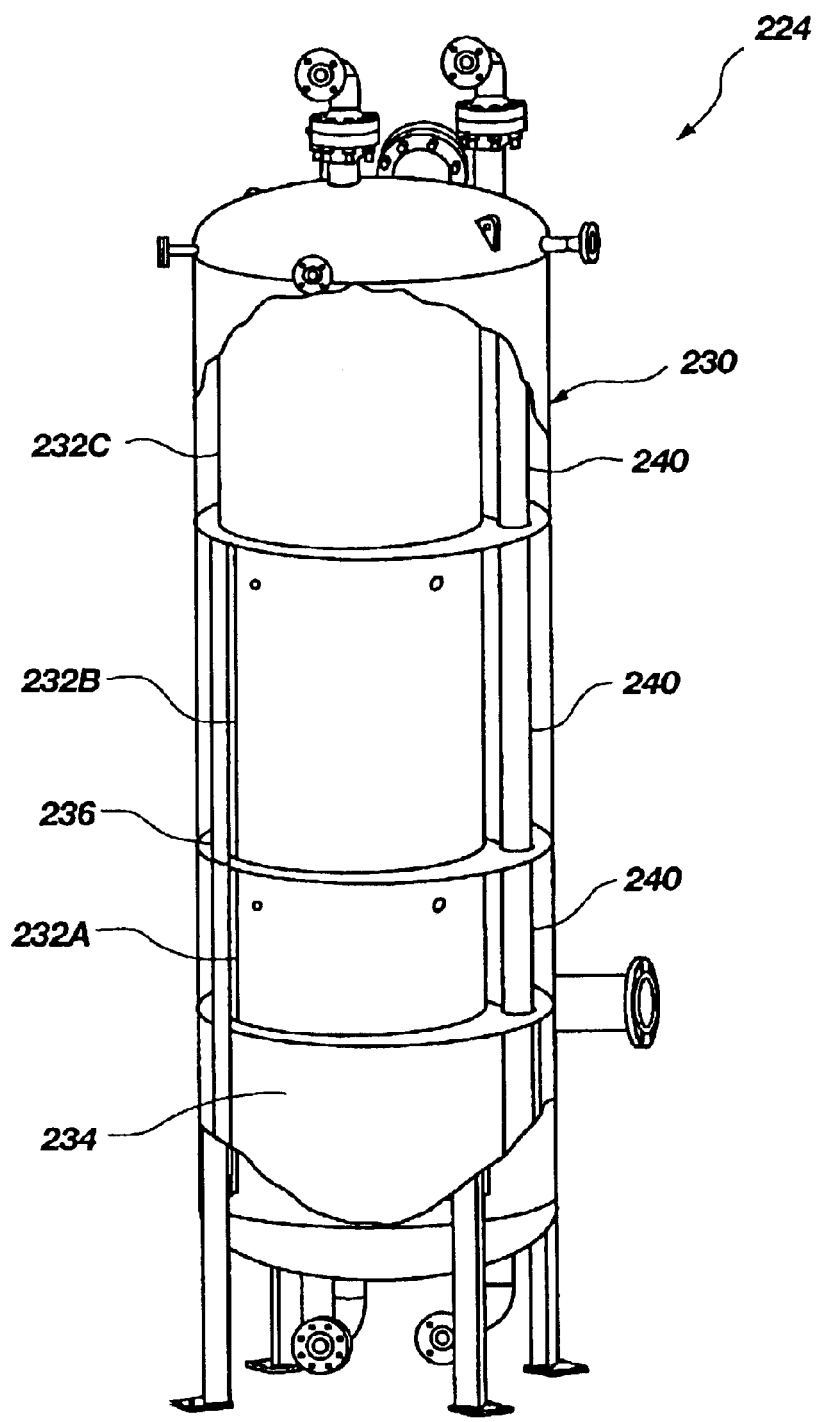
FIGS. 5A and 5B show a heat exchanger according to one embodiment of the present invention.

One exemplary heat exchanger 224 used for processing the solid $CO_2$ may include a tube-in-shell type heat exchanger. Referring to FIG. 5A, an exemplary tube-in-shell heat exchanger 224 constructed in accordance with the present invention is shown with a portion of the tank 230 stripped away to reveal a plurality of, in this instance three, cooling coils 232A–232C stacked vertically therein. A filter material 234 may also be disposed in the tank 230 about a portion of the lower coil 232A to ensure that no solid $CO_2$ exits the heat exchanger 224. The filter material 234 may include, for example, stainless steel mesh. One or more structural supports 236 may be placed in the tank to support the coils 232A–232C as may be required depending on the size and construction of the coils 232A–232C.

Figure 6B:
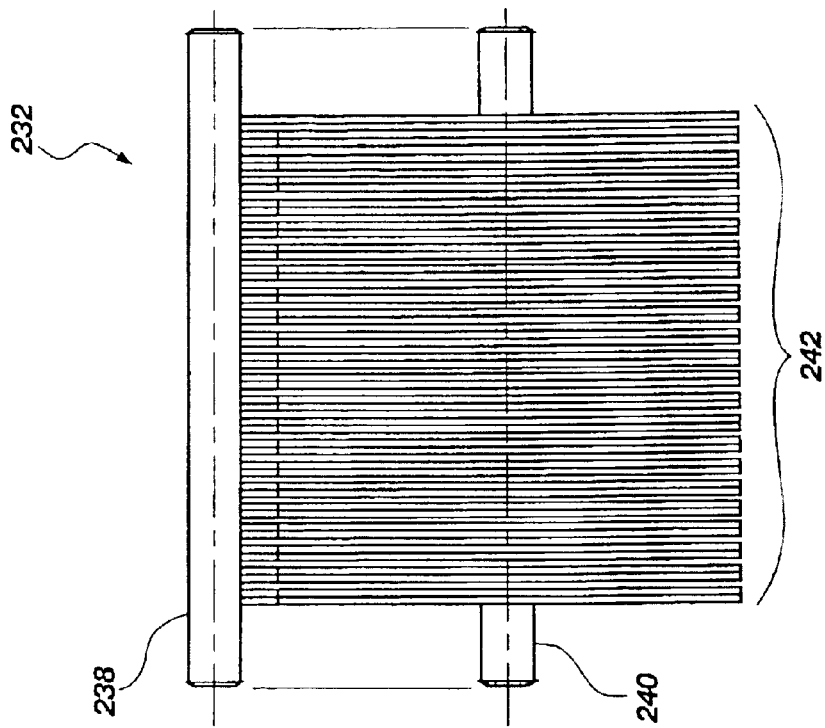
FIGS. 6A and 6B show plan and elevational views of cooling coils used in the heat exchanger of FIGS. 5A and 5B.
Figure 6A:
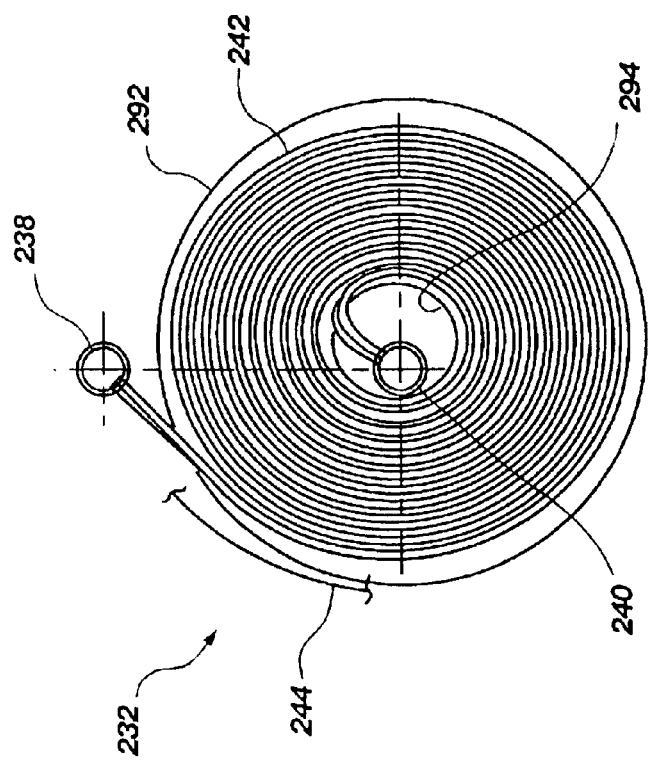

Referring briefly to FIGS. 6A and 6B, an exemplary cooling coil, or coiled bundle 232 may include inlet/outlet pipes 238 and 240 with a plurality of individual tubing coils 242 coupled therebetween. The tubing coils 242 are in fluid communication with each of the inlet/outlet pipes 238 and 240 and are structurally and sealingly coupled therewith. Thus, in operation, fluid may flow into the first inlet/outlet pipe 240 for distribution among the plurality of tubing coils 242 and pass from the tubing coils 242 into the second inlet/outlet pipe 238 to be subsequently discharged therefrom. Of course, if desired, the flow through the cooling coils 232 could be in the reverse direction as set forth below.

An exemplary coil 232 may include, for example, inlet/outlet pipes 238 and 240 which are formed of 3 inch diameter, schedule 80 304L stainless steel pipe. The tubing coils 242 may be formed of 304L stainless steel tubing having a wall thickness of 0.049 inches. The cooling coils 232 may further be designed and sized to accommodate flows having, for example, but not limited to, pressures of approximately 815 psia at a temperature between approximately −240° F. and −200° F. Such coils 232 are available from the Graham Corporation located at Batavia, N.Y.

Referring back to FIG. 5A, the ends of the inlet/outlet pipes 238 and 240 of each individual cooling coil, for example coil 232B, are sealingly and structurally coupled to the corresponding inlet/outlet pipes 238 and 240 of each adjacent coil, i.e., 232A and 232C. Such connection may be made, for example, by welding or by other mechanical means.

Figure 5B:
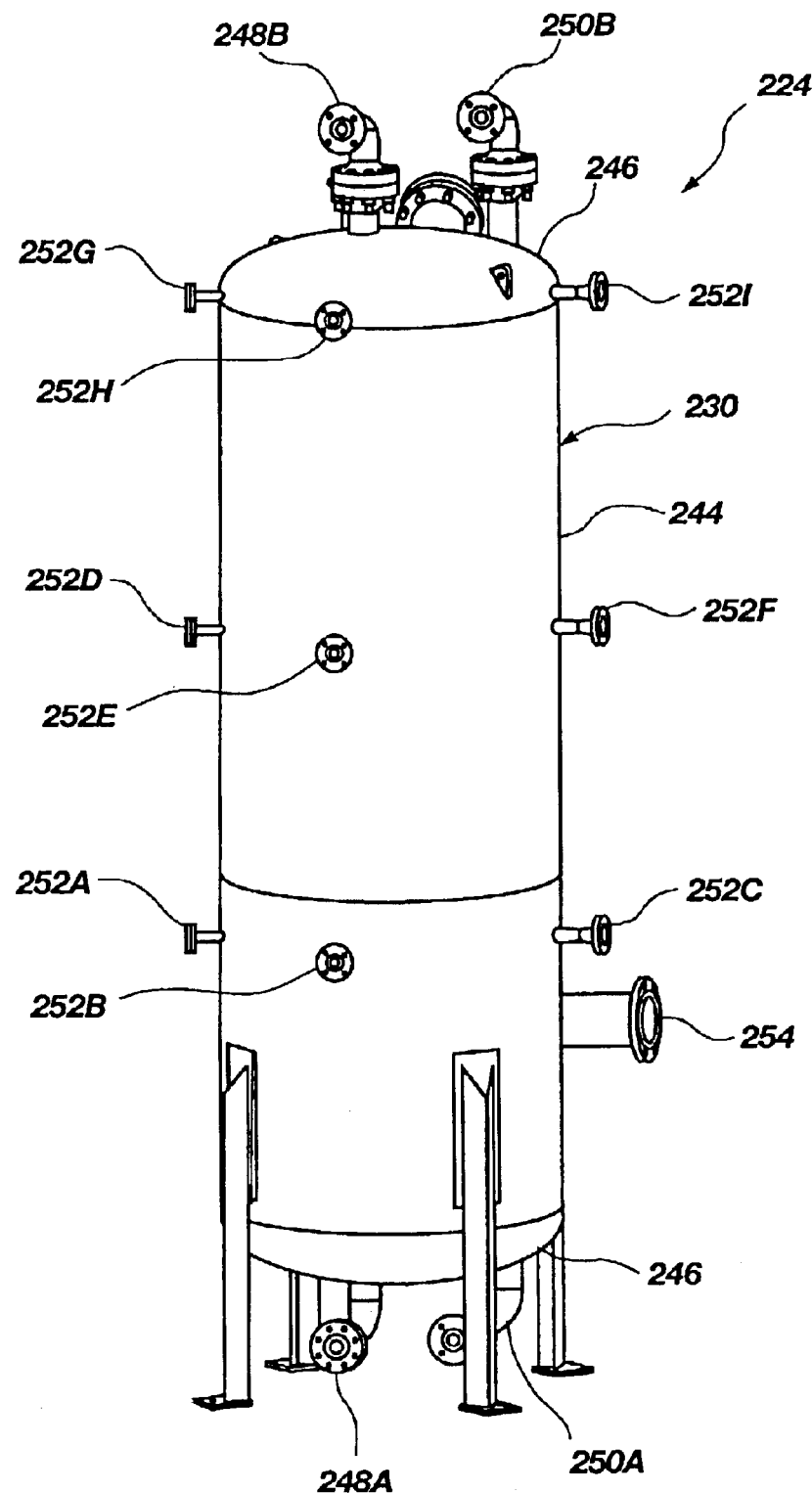

Referring now to FIG. 5B, the tank 230 includes a shell 244 and end caps 246 with a plurality of inlets and outlets coupled therewith. The shell 244 and end caps 246 may be formed of, for example, 304 or 304L stainless steel such that the tank 230 has a design pressure of approximately 95 psia for operating temperatures of approximately −240° F. Desirably, the tank 230 may be designed with adequate corrosion allowances for a minimum service life of 20 years.

Fluid may be introduced into the coiling tubes 232A–232C through one of a pair of coil inlets 248A and 250A which are respectively coupled with the inlet/outlet pipe(s) 238 and 240 of a cooling coil 232A. The coil inlets 248A and 250A may be designed, for example, to accommodate a flow of high density gas of at least approximately 5000 lbm/hr having a pressure of approximately 750 psia at a temperature of approximately −102° F.

A set of coil outlets 248B and 250B are respectively associated with, and sealingly coupled to, the inlet/outlet pipes 238 and 240 of a coil 232C. Each tube outlet 248B and 250B may be designed, for example, to accommodate a flow of high density fluid of at least approximately 5000 lbm/hr having a pressure of approximately 740 psia at a temperature of approximately −205° F.

A plurality of tank inlets 252A–252I are coupled with the tank 230 allowing the cooling streams 253 and 255 (FIG. 4), including removed solid $CO_2$, to enter into the tank 230 and flow over one or more coils 232A–232C. For example, tank inlets 252A–252C allow one or more of the cooling streams 253 and 255 to enter the tank 230 and flow over coil 232A, while tank inlets 252D–252F allow one or more of the cooling streams 253 and 255 to enter the tank 230 and flow first over coil 232B and then over coil 232A. The tank inlets 252A–252I may be positioned about the periphery of the shell 244 to provide a desired distribution of the cooling streams 253 and 255 with respect to the coils 232A–232C.

Each tank inlet 252A–252I may be designed to accommodate flows having varying characteristics. For example, tank inlet 252G may be designed to accommodate a slurry of liquid methane having approximately 10% solid $CO_2$ at a mass flow rate of approximately 531 lbm/hr having a pressure of approximately 70 psia and a temperature of approximately −238° F. Tank inlet 252H may be designed to accommodate a flow of mixed gas, liquid and solid $CO_2$ at a flow rate of approximately 1012 lbm/hr exhibiting a pressure of approximately 70 psia and a temperature of approximately −218° F. Tank inlet 252I may be designed to accommodate a flow of mixed gas, liquid and solid $CO_2$ at a flow rate of approximately 4100 lbm/hr exhibiting a pressure of approximately 70 psia and a temperature of approximately −218° F.

It is also noted that, as shown in FIG. 6A of the drawings, an outermost interior shell or splash jacket 292 may be formed about the cooling coils 232A–232C such that an annulus may be formed between the interior shell and the tank shell 244. The interior shell may be configured to control the flow of the entering cooling streams through the various tank inlets 252A–252I such that the cooling streams flow over the cooling coils 232A–232C but do not contact the tank shell 244 of the heat exchanger 224. Additionally, an innermost interior shell or splash jacket 294 may be formed within the cooling coils 232A–232C such that an annulus may be formed between the interior of the coils and the inlet/outlet pipe 240. Stainless steel, such as 304L or other corrosive resistant materials are suitable for use in forming jackets 292 and/or 294.

A tank outlet 254 allows for discharge of the cooling streams 253 and 255 after they have passed over one or more coils 232A–232C. The tank outlet 254 may be designed, for example, to accommodate a flow of gas at a mass flow rate of approximately 5637 lbm/hr having a pressure of approximately 69 psia and a temperature of approximately −158° F.

Referring now to FIGS. 7A through 7C, a schematic is shown of various flow configurations possible with the heat exchanger 224. The heat exchanger 224 may be configured such that the process stream 154''' entering through the tube inlet 248A may pass through less than the total number of cooling coils 232A–232C. Thus, if it is desired, the process stream 154''' may flow through all three cooling coils 232A–232C, only two of the cooling coils 232A and 232B, or through just one of the cooling coils 232A or 250B. Flow through the first coil 232A, appropriate piping will allow the process stream 154''' to exit through associated tubing outlet 250A. Similarly, if it is desired that the process stream 154''' flow through coils 232A and 232B, it may exit through associated tubing outlet 248B.

For example, referring to FIG. 7A, the process stream 154''' may enter coil inlet 248A to flow, initially, through the inlet/outlet pipe 240. At a location above where the first coil 232A is coupled with the inlet/outlet pipe 240, a flow diverter 251A blocks the process stream 154''' forcing it to flow through the first cooling coil 232A. While there may be some transitory flow into the other coils 232B and 232C, the steady state flow of the process stream 154''' will be through the inlet/outlet pipe 238 exiting the coil outlet 250B and/or coil outlet 250A.

Referring to FIG. 7B, it can be seen that the use of two flow diverters 251A and 251B will cause the process stream 154''' to traverse through the first coil 232A, as was described with respect to FIG. 7A, and then flow through inlet/outlet pipe 238 until it encounters the second diverter 251B. The second diverter will cause the process stream 154''' to flow through the second coil 232B and then through the inlet/outlet pipe 240 through the coil outlet 248B.

Referring to FIG. 7C, it is shown that the use of three flow diverters 251A–251C will cause the process stream 154''' to traverse through the first two coils, as was described with respect to FIG. 7B, and then through inlet/outlet pipe 240 until it encounters the third diverter 251C. The third diverter will cause the process stream 154''' to flow through the third coil 232C and then through the inlet/outlet pipe 238 exiting the coil outlet 250B. Thus, depending on the placement of the diverters 251A–251C, the capacity of the heat exchanger is readily adapted to various processing conditions and output requirements.

The flow diverters 251A–251C may comprise plugs, valves or blind flanges as may be appropriate. While valves or blind flanges may be easily adapted to the process when located externally to the heat exchanger 224 (e.g., at coil outlet 248B) it is desirable that plugs be used in the internal locations (e.g., for the diverters 251A and 251B adjacent the first and second coils respectively). An exemplary plug 251 is shown in FIGS. 8A and 8B. The plug 251 may be include a threaded exterior portion 290 for engagement with a cooperatively threaded structure within the inlet/outlet pipes 238 and 240. A keyed head 292 is configured to cooperatively mate with a tool for rotating the plug 251 in association with the plugs' installation or removal from the inlet/outset pipes 238 and 240. Additionally, a set of interior threads 294 may be formed in the keyed head so as to lockingly engage the installation/removal tool therewith such that the plug may be disposed in an inlet/outlet pipe 238 and 240 of substantial length. Furthermore, the configuration, quantity, and placement of the flow diverters and cooling coils as discussed and illustrated are exemplary. Thus, it will be understood that a wide variety of alternative flow diverters and cooling coil arrangements can be used in accordance with the present invention.

In conjunction with controlling the flow of the process stream 154''' through the cooling coils 232A–232C, the cooling stream(s) entering through the tank inlets 252A–252I may be similarly controlled through appropriate valving and piping.

Referring back to FIG. 4, as the process stream 154''' exits the heat exchanger 224 through line 256, it is divided into a cooling stream 170' and a product stream 172'. The cooling stream 170' passes through a JT valve 174' which expands the cooling stream 170' producing various phases of $CO_2$, including solid $CO_2$ therein, forming a slurry of natural gas and $CO_2$. This $CO_2$ rich slurry enters heat exchanger 224 through one or more of the tank inputs 252A–252I to pass over one or more coils 232A–232C (see FIGS. 5A and 5B).

The product stream 172' passes through a JT valve 176' and is expanded to a low pressure, for example approximately 35 psia. The expansion via JT valve 176' also serves to lower the temperature, for example to approximately −240° F. At this point in the process, solid $CO_2$ is formed in the product stream 172'. The expanded product stream 172'', now containing solid $CO_2$, enters the liquid/vapor separator 180 wherein the vapor is collected and removed from the separator 180 through piping 182' and added to a combined cooling stream 257 for use as a refrigerant in heat exchanger 224. The liquid in the liquid/vapor separator 180 will be a slurry comprising the LNG fuel product and solid $CO_2$.

The slurry may be removed from the separator 180 to a hydrocyclone 258 via an appropriately sized and configured pump 260. Pump 260 is primarily used to manage vapor generation resulting from a pressure drop through the hydrocyclone 258. That is pump 260 manages vapor by taking the cold slurry and pressurizing it to a subcooled state. Upon the subcooled slurry passing through hydrocyclone 258, the slurry returns to a state of equilibrium thus preventing fuel product vapor and/or vaporized $CO_2$ formation as result of the slurry experiencing a pressure drop while passing through the hydrocyclone. Pump 260 is schematically shown in FIG. 4 to be external to the liquid/vapor separator 180, the pump may be physically located within the liquid/vapor separator 260 if so desired. In such a configuration, the pump may be submersed in the lower portion of the separator 180. A suitable pump may be configured to have an adjustable flow rate of approximately 2 to 6.2 gallons per minute (gpm) of LNG with a differential pressure of 80 psi while operating at −240° F. The adjustable flow rate may be controlled by means of a variable frequency drive. Such an exemplary pump is available from Barber-Nichols located in Arvada, Colo.

The hydrocyclone 258 acts as a separator to remove the solid $CO_2$ from the slurry allowing the LNG product fuel to be collected and stored. An exemplary hydrocyclone 258 may be designed, for example, to operate at a pressure of approximately 125 psia at a temperature of approximately −238° F. The hydrocyclone 258 uses a pressure drop to create a centrifugal force which separates the solids from the liquid. A thickened slush, formed of a portion of the liquid natural gas with the solid $CO_2$, exits the hydrocyclone 258 through an underflow 262. The remainder of the liquid natural gas is passed through an overflow 264 for additional filtering. A slight pressure differential, for example, approximately 0.5 psi, exists between the underflow 262 and the overflow 264 of the hydrocyclone. Thus, for example, the thickened slush may exit the underflow 262 at approximately 40.5 psia with the liquid natural gas exiting the overflow 264 at approximately 40 psia. However, other pressure differentials may be more suitable depending of the specific hydrocyclone 258 utilized. A control valve 265 may be positioned at the overflow 264 of the hydrocyclone 258 to assist in controlling the pressure differential experienced within the hydrocyclone 258.

A suitable hydrocyclone 258 is available, for example, from Krebs Engineering of Tucson, Ariz. An exemplary hydrocyclone may be configured to operate at design pressures of up to approximately 125 psi within a temperature range of approximately 100° F. to −300° F. Additionally, an exemplary hydrocyclone desirably includes an interior which is micro-polished to an 8–12 micro inch finish or better.

Figure 9:
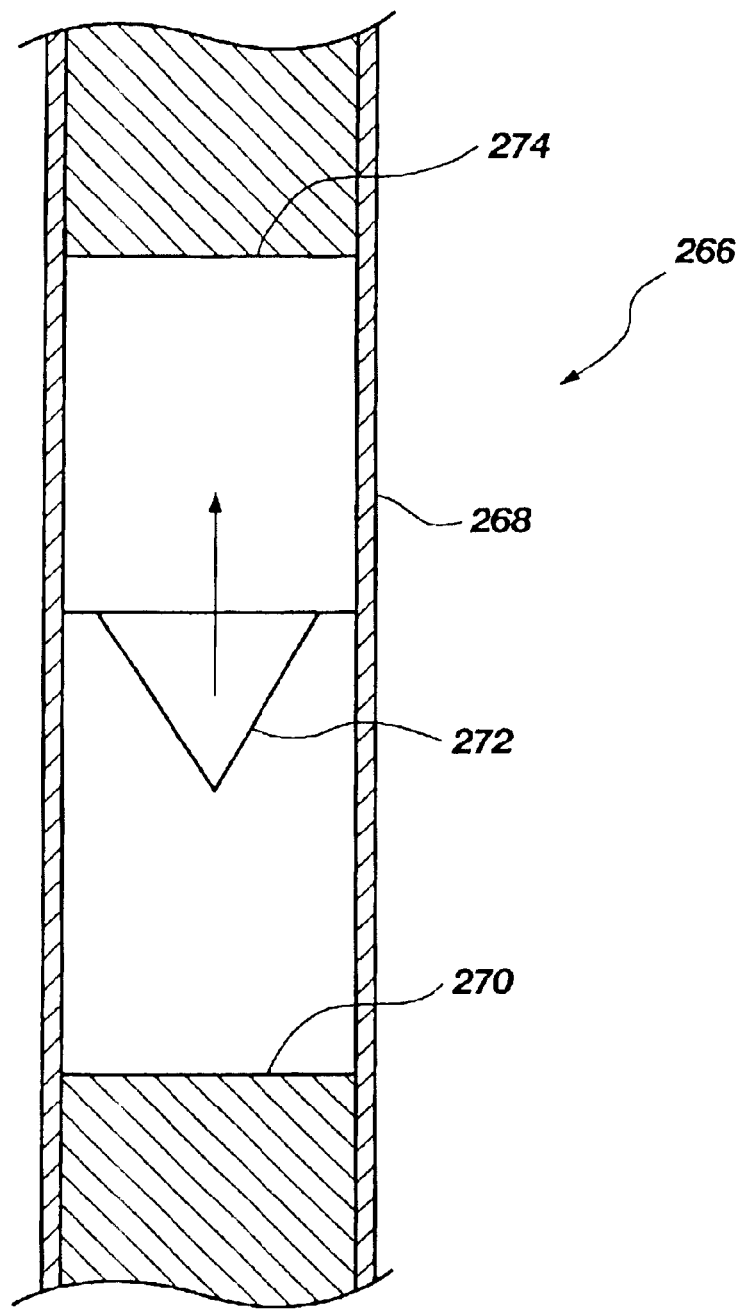
FIG. 9 is a cross sectional view of an exemplary $CO_2$ filter used in conjunction with the liquefaction plant and process of FIG. 4.

The liquid natural gas passes through one of a plurality, in this instance two, $CO_2$ screen filters 266A and 266B placed in parallel. The screen filters 266A and 266B capture any remaining solid $CO_2$ which may not have been separated out in the hydrocyclone 258. Referring briefly to FIG. 9, an exemplary screen filter 266 may be formed of 6 inch schedule 40 stainless steel pipe 268 and include a first filter screen 270 of coarse stainless steel mesh, a second conical shaped filter screen 272 of stainless steel mesh less coarse than the first filter screen 270, and a third filter screen 274 formed of fine stainless steel mesh. For example, in one embodiment, the first filter screen 270 may be formed of 50 to 75 mesh stainless steel, the second filter screen 272 may be formed of 75 to 100 mesh stainless steel and the third filter screen 274 may be formed of 100 to 150 mesh stainless steel. In another embodiment, two of the filter screens 270 and 274 may be formed of the same grade of mesh, for example 40 mesh stainless steel or finer, and packed in a less dense or more dense manner to get the desired effect. That is, filter screen 270 can be fabricated from a mesh blanket or screen that is rolled relatively loosely to provide a less dense, or less surface area, packing and filter screen 274 can be fabricated from the same mesh blanket or screen material but rolled more tightly to produce a more dense, or higher surface area packing.

The $CO_2$ screen filters 266A and 266B may, from time to time, become clogged or plugged with solid $CO_2$ captured therein. Thus, as one filter, i.e., 266A, is being used to capture $CO_2$ from the liquid natural gas stream, the other filter, i.e., 266B, may be purged of $CO_2$ by passing a relatively high temperature natural gas therethrough in a counter flowing fashion. For example, gas may be drawn after the water clean-up cycle through a fourth heat exchanger 275 as indicated at interface points 276C and 276B to flow through and clean the $CO_2$ screen filter 266B. Gas may be flowed through one or more pressure regulating valves 277 prior to passing through the heat exchanger 275 and into the $CO_2$ screen filter 266B as may be dictated by pressure and flow conditions within the process.

During cleaning of the filter 266B, the cleaning gas may be discharged back to coil-type heat exchanger 224 as is indicated by interface connections 301B and 301C. Appropriate valving and piping allows for the filters 266A and 266B to be switched and isolated from one another as may be required. Other methods of removing $CO_2$ solids that have accumulated on the filters are readily known by those of ordinary skill in the art.

The filtered liquid natural gas exits the plant 102″ for storage as described above herein. A fail open-type valve 279 may be placed between the lines coming from the plant inlet and outlet as a fail safe device in case of upset conditions either within the plant 102″ or from external sources, such as the tank 116 (FIG. 1).

The thickened slush formed in the hydrocyclone 258 exits the underflow 262 and passes through piping 278 to heat exchanger 224 where it helps to cool the process stream 154′ flowing therethrough. Vapor passing through line 182′ from the liquid/vapor separator 180 passes through a back pressure control valve 280A and is combined with a portion of gas drawn off heat exchanger 224 through line 259 to form a combined cooling stream 257. The combined cooling stream 257 flowing through line 259 further serves as "make-up" to keep eductor 282 working correctly if the flow rate through back pressure control valve 280A is too low. Back pressure control valve 280B is preferably set a couple to a few psi higher than pressure control valve 280A to keep combined cooling stream 257 moving in the correct direction. The combined cooling stream 257 then passes through an eductor 282. A motive stream 284, drawn from the process stream between the high efficiency heat exchanger 166 and coil-type heat exchanger 224, also flows through the eductor and serves to draw the combined cooling stream 257 into one or more of the tank inlets 252A–252I (FIG. 5B). An exemplary eductor 282 may be configured to operate at a pressure of approximately 764 psia and a temperature of approximately −105° F. for the motive stream, and pressure of approximately 35 psia and temperature of approximately −240° F. for the suction stream with a discharge pressure of approximately 69 psia. Such an eductor is available from Fox Valve Development Corp. of Dover, N.J.

The $CO_2$ slurries introduced into heat exchanger 224, either via cooling stream 170′, combined cooling stream 257 or underflow stream 278, flow downwardly through the heat exchanger 224 over one or more or cooling coils 232A–232C causing the solid $CO_2$ to sublime. This produces a cooling stream 286 that has a temperature high enough to eliminate solid $CO_2$ therein. The cooling stream 286 exiting heat exchanger 224 is combined with the expanded cooling stream 152′ from the turbo 156 expander to form combined cooling stream 178′ which is used to cool compressed process stream 154′ in the high efficiency heat exchanger 166. Upon exiting the heat exchanger 166, the combined cooling stream 178′ is further combined with various other gas components flowing through interface connection 136A, as described throughout herein, for discharge into the downstream section 130 of the pipeline 104 (FIG. 1).

Figure 10:
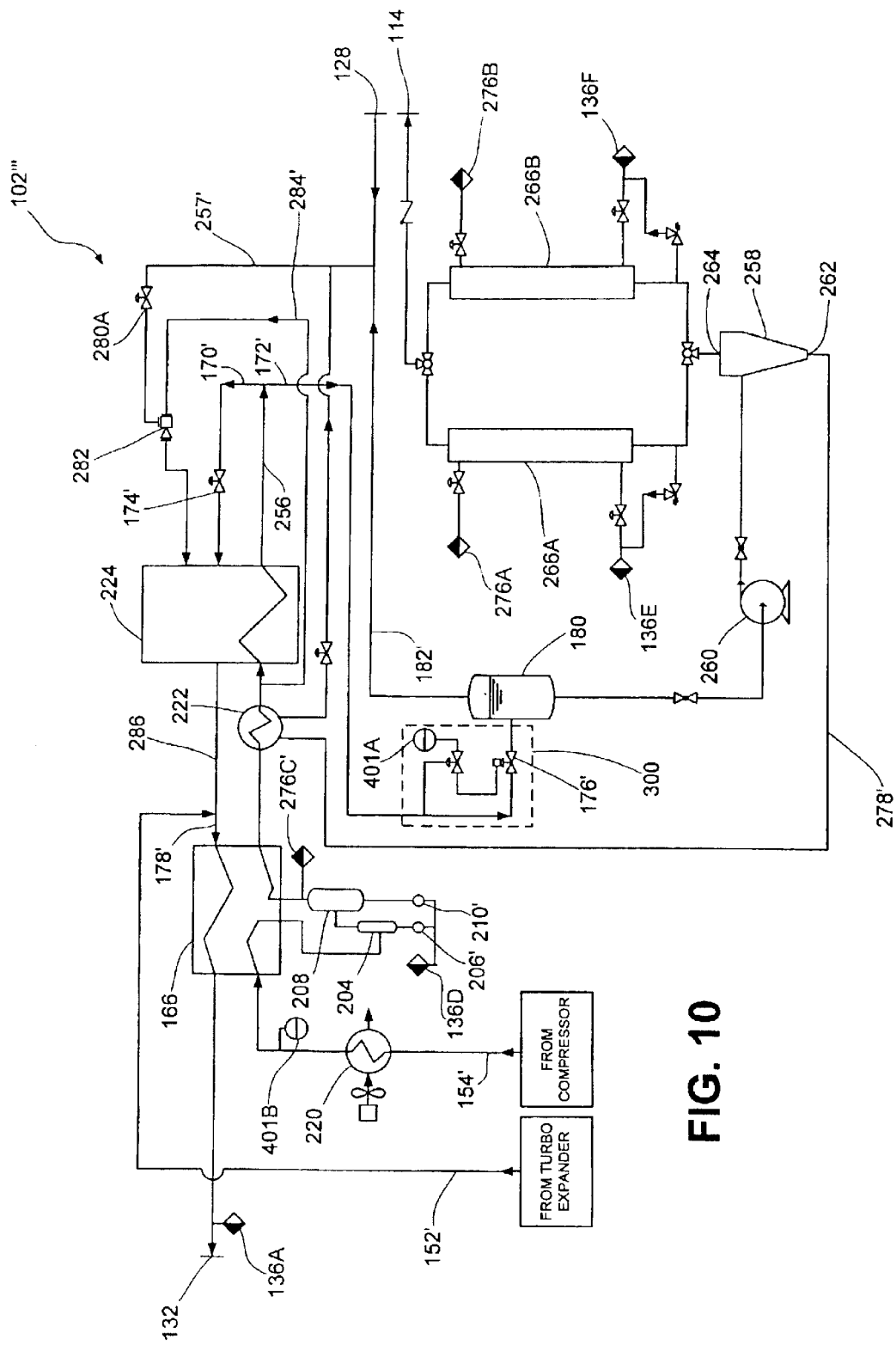
FIG. 10 is a process flow diagram depicting a liquefaction cycle according to another embodiment of the present invention.

Referring now to FIG. 10, a liquefaction plant 102''' according to another embodiment of the invention is shown. The liquefaction plant 102''' operates essentially in the same manner as the liquefaction plant 102' of FIG. 4 with some minor modifications.

A fourth heat exchanger 222 is located along the flow path of the process stream sequentially between high efficiency heat exchanger 166' and heat exchanger 224. Heat exchanger 222 is associated with the removal of $CO_2$ and serves primarily to heat solid $CO_2$ which is removed from the process stream at a later point in the cycle, as shall be discussed in greater detail below. The fourth heat exchanger 222 also assists in cooling the gas in preparation for liquefaction and $CO_2$ removal.

The thickened slush formed in the hydrocyclone 258 exits the underflow 262 and passes through piping 278' to heat exchanger 222, wherein the density of the thickened sludge is reduced. As the $CO_2$ slurry exits heat exchanger 222 it combines with any vapor entering through plant inlet 128 (from tank 116 shown in FIG. 1) as well as vapor passing through line 182' from the liquid/vapor separator 180 forming combined cooling stream 257'. The combined cooling stream 257' passes through a back pressure control valve 280A and then through an eductor 282. A motive stream 284', drawn from the process stream between heat exchanger 222 and heat exchanger 224, also flows through the eductor and serves to draw the combined cooling stream 158 into one or more of the tank inlets 252A–252I (FIG. 5B).

As with the embodiment described in reference to FIG. 4, the $CO_2$ slurries introduced into heat exchanger 224, either via cooling stream 170' or combined cooling stream 257, flow downwardly through the heat exchanger 224 over one or more cooling coils 232A–232C causing the solid $CO_2$ to sublime. This produces a cooling stream 286 that has a temperature high enough to eliminate solid $CO_2$ therein. The cooling stream exiting heat exchanger 224 is combined with the expanded cooling stream 152' from the turbo 156 expander to form combined cooling stream 178' which is used to cool compressed process stream 154' in the high efficiency heat exchanger 166. Upon exiting the heat exchanger 166, the combined cooling stream 178' is further combined with various other gas components flowing through interface connection 136A, as described throughout herein, for discharge into the downstream section 130 of the pipeline 104 (FIG. 1).

As with embodiments discussed above, the $CO_2$ screen filters 266A and 266B may require cleaning or purging from time to time. However, in the embodiment shown in FIG. 10, gas may be drawn after the water clean-up cycle at interface point 276C and enter into interface point 276A or 276B to flow through and clean $CO_2$ screen filters 266A or 266B. During cleaning of the filter 266B, the cleaning gas may be discharged back to the pipeline 104 (FIG. 1) as is indicated by interface connections 136E or 136F and 136A. Appropriate valving and piping allows for the filters 266A and 266B to be switched and isolated from one another as may be required. Other methods of removing $CO_2$ solids that have accumulated on the filters are readily known by those of ordinary skill in the art. The filtered liquid natural gas exits the plant 102" for storage as described above herein.

Figure 11A:
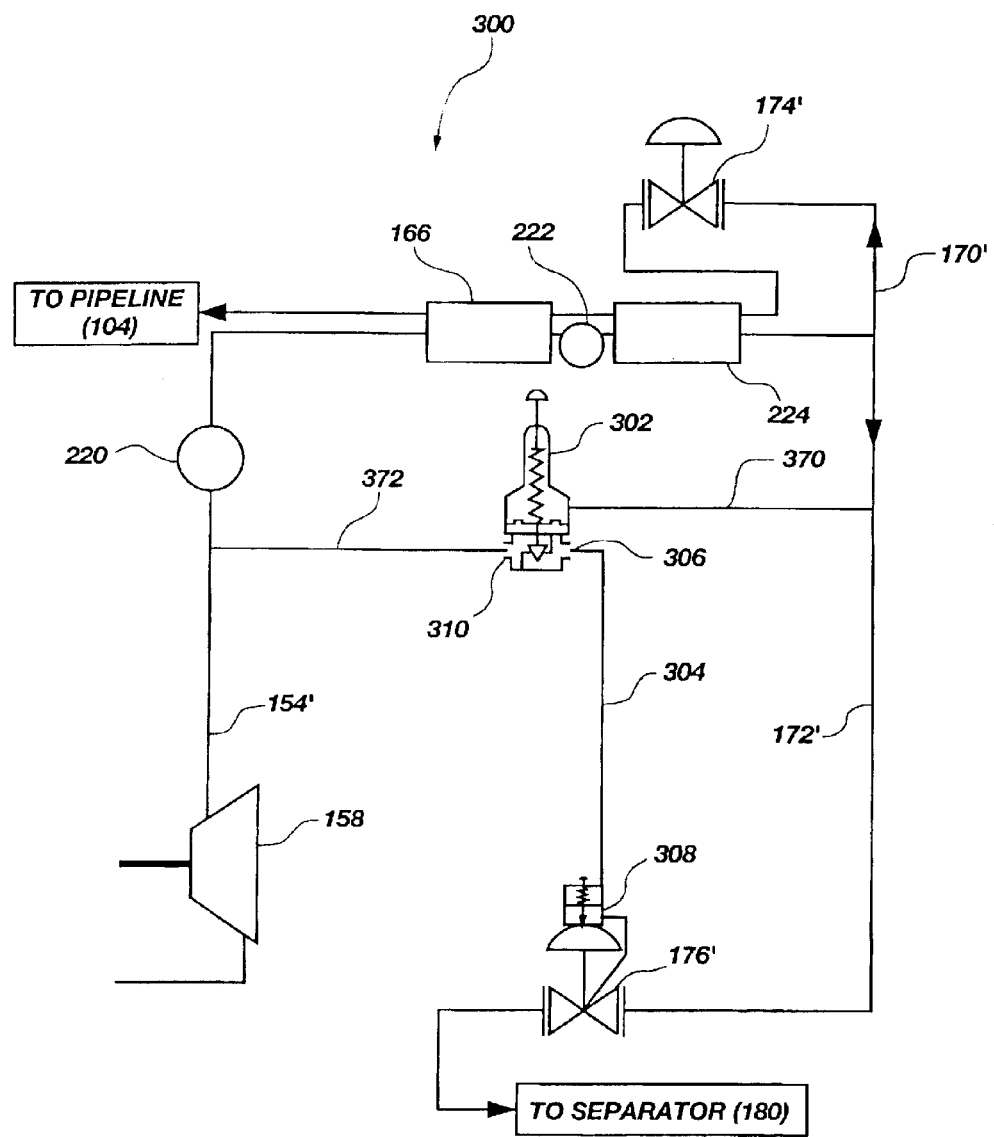
FIG. 11A is a process schematic showing a differential pressure circuit incorporated in the plant and process of FIG. 10.
Figure 12:
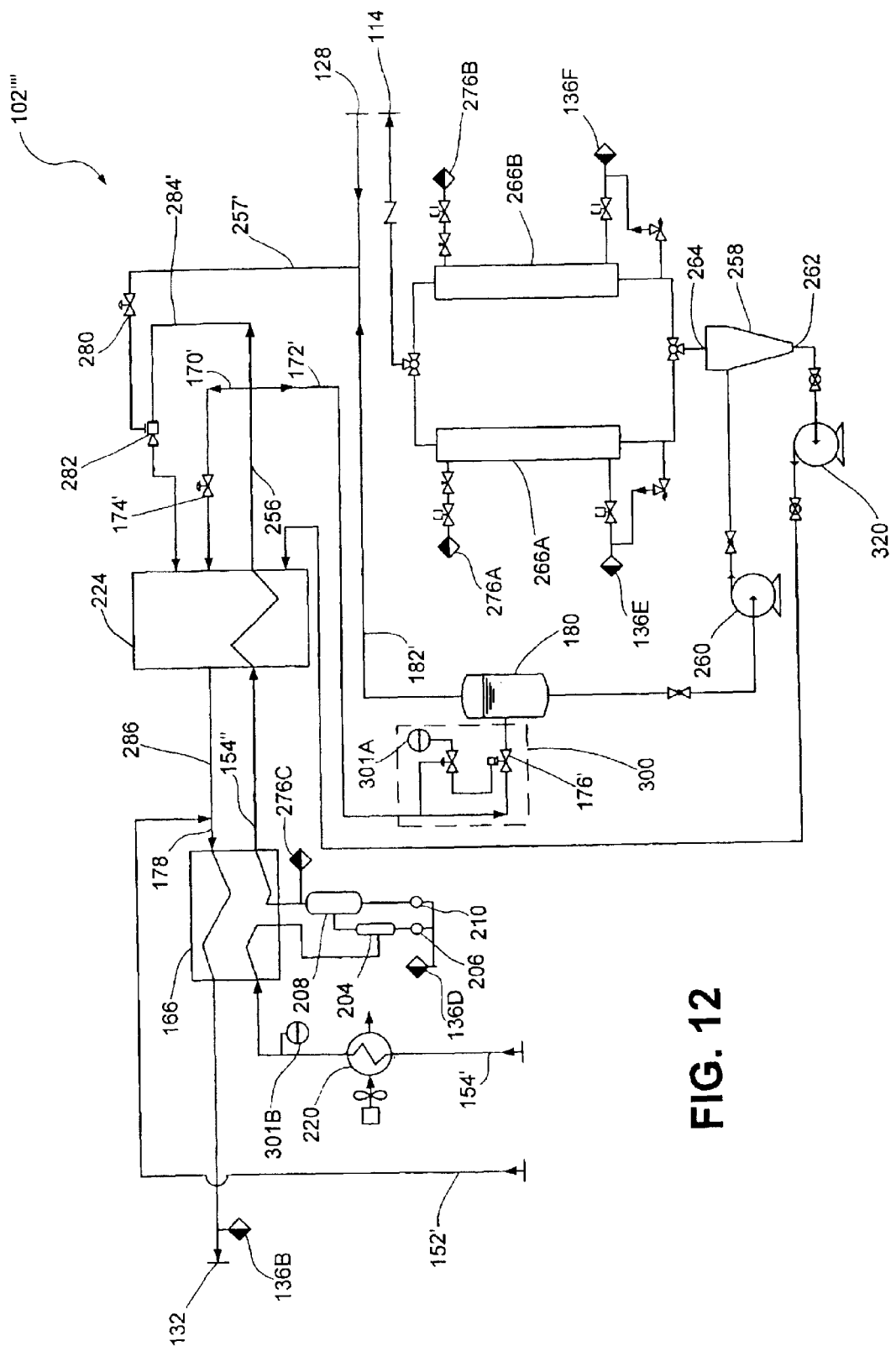
FIG. 12 is a process flow diagram depicting a liquefaction cycle according to another embodiment of the present invention.

Referring now to FIGS. 11A and 12, a differential pressure circuit 300 of plant 102''' is shown. The differential pressure circuit 300 is designed to balance the flow entering the JT valve 176' just prior to the liquid/vapor separator 180 based on the pressure difference between the compressed process stream 154' and the product stream 172'. The JT valve 174' located along cooling stream 170' acts as the primary control valve passing a majority of the mass flow exiting from heat exchanger 224 in order to maintain the correct temperature in the product stream 172'. During normal operating conditions, it is assumed that gas will always be flowing through JT valve 174'. Opening up JT valve 174' increases the flow back into heat exchanger 224 and consequently decreases the temperature in product stream 172'. Conversely, restricting the flow through JT valve 174' will result in an increased temperature in product stream 172'.

JT valve 176' located in the product stream 172' serves to balance any excess flow in the product stream 172' due to variations, for example, in controlling the temperature of the product stream 172' or from surges experienced due to operation of the compressor 158.

A pressure differential control (PDC) valve 302 is disposed between, and coupled to the compressed process stream 154' and the product stream 172' (as is also indicated by interface connections 301A and 301B in FIG. 4). A pilot line 304 is coupled between the low pressure side 306 of the PDC valve 302 and the pilot 308 of JT valve 176'. Both the PDC valve 302 and the pilot 308 of JT valve 176' are biased (i.e., with springs) for pressure offsets to compensate for pressure losses experienced by the flow of the process stream 154' through the circuit containing heat exchangers 166, 222 (if used) and 224.

The following are examples of how the differential pressure circuit 300 may behave in certain exemplary situations.

In one situation, the pressure and flow increase in the compressed process stream 154' due to fluctuations in the compressor 158. As pressure increases in the compressed process stream 154', the high side 310 of the PDC valve 302 causes the PDC valve 302 to open, thereby increasing the pressure within the pilot line 304 and the pilot 308 of JT valve 176'. After flowing through the various heat exchangers, a new pressure will result in the product stream 172'. With flow being maintained by JT valve 174', excessive process fluid built up in the product stream 172' will result in less pressure loss across the heat exchangers, bringing the pressure in the product stream 172' closer to the pressure exhibited by the compressed process stream 154'. The increased pressure in the product stream 172' will be sensed by the PDC valve 302 and cause it to close thereby overcoming the pressure in the pilot line 304 and the biasing element of the pilot 308. As a result, JT valve 176' will open and increase the flow therethrough. As flow increases through JT valve 176' the pressure in the product stream 172' will be reduced.

In a second scenario, the pressure and flow are in a steady state condition in the compressed process stream 154'. In this case the compressor will provide more flow than will be removed by JT valve 174', resulting in an increase in pressure in the product stream 172'. As the pressure builds in the product stream, the PDC 302 valve and JT valve 176' will react as described above with respect to the first scenario to reduce the pressure in the product stream 172'.

In a third scenario, JT valve 174' suddenly opens, magnifying the pressure loss across the heat exchangers 224 and 166 and thereby reducing the pressure in the product stream 172'. The loss of pressure in the product stream 172' will be sensed by the PDC valve 302, thereby actuating the pilot 308 such that JT valve 176' closes until the flow comes back into equilibrium.

In a fourth scenario, JT valve 174' suddenly closes, causing a pressure spike in the product stream 172'. In this case, the pressure increase will be sensed by the PDC valve 302, thereby actuating the pilot 308 and causing JT valve 176' to open and release the excess pressure/flow until the pressure and flow are back in equilibrium.

In a fifth scenario, the pressure decreases in the compressed process stream 154' due to fluctuations in the compressor. This will cause the circuit 300 to respond such that JT valve 176' momentarily closes until the pressure and flow balance out in the product stream 172'.

The JT valve 174' is a significant component of the differential pressure circuit 300 as it serves to maintain the split between cooling stream 170' and product stream 172' subsequent the flow of compressed process stream 154' through heat exchanger 224. JT valve 174' accomplishes this by maintaining the temperature of the stream in line 256 exiting heat exchanger 224. As the temperature in line 256 (and thus in cooling stream 170' and process stream 172') drops below a desired temperature, the flow through JT valve 174' may be adjusted to provide less cooling to heat exchanger 224. Conversely as the temperature in line 256 raises above a desired temperature, the flow through JT valve 174' may be adjusted to provide additional cooling to heat exchanger 224.

Figure 11B:
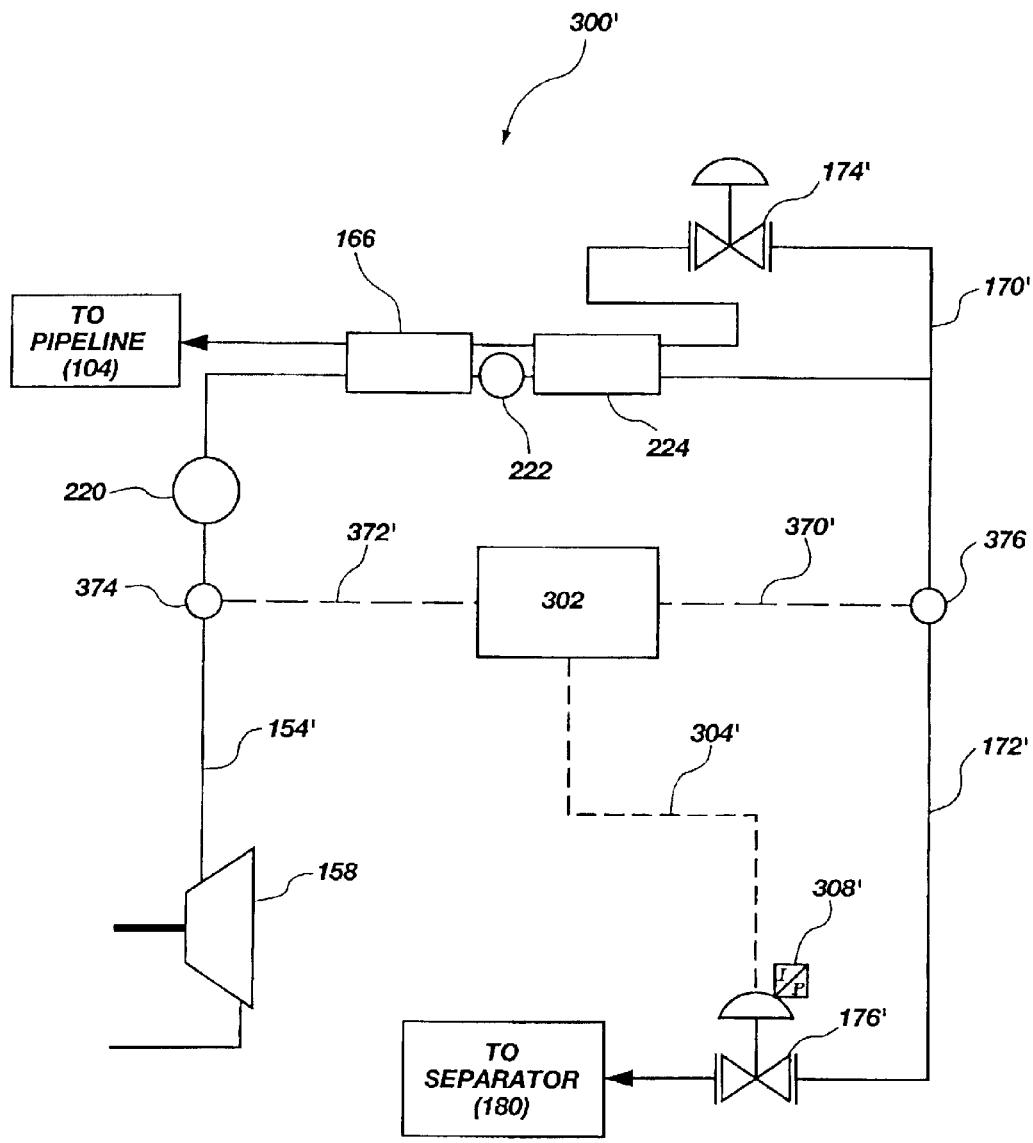
FIG. 11B is a process schematic showing a preferred differential pressure circuit incorporated in the plant and process of FIG. 10.

Referring now to FIG. 11B, a preferred circuit 300' is shown. The operation of circuit 300' is generally the same as circuit 300 described above, however instead of using mechanical control, circuit 300' is electrical-pneumatically controlled. The primary differences between circuit 300 and 300' include replacing pressure sense lines 370 and 372 with pressure sensors 374 and 376 and electrical leads 370' and 372'. Furthermore, the differential pressure regulator 302 and control line 304 are replaced by an electrical controller 302' and an electro-pneumatic sense line 304' and pilot 308 is replaced with a current-to-pneumatic (I/P) pilot control 308'. It should be noted that when using circuit 300 or circuit 300' will work with any number of heat exchangers that would provide a pressure drop from 154' to 172'.

Referring now to FIG. 12, a liquefaction plant 102''' and process is shown according to another embodiment of the invention. The liquefaction plant 102''' operates essentially in the same manner as the liquefaction plant 102''' of FIG. 10 with some minor modifications. Rather than passing the thickened $CO_2$ slush from the hydrocyclone 258 through a heat exchanger 222 (FIG. 10), a pump 320 accommodates the flow of the thickened $CO_2$ slush back to heat exchanger 224. The configuration of plant 102''' eliminates the need for an additional heat exchanger (i.e., 222 of FIG. 10). However, flow of the thickened $CO_2$ slush may be limited by the capacity of the pump and the density of the thickened slush in the configuration shown in FIG. 10.

Figure 13:
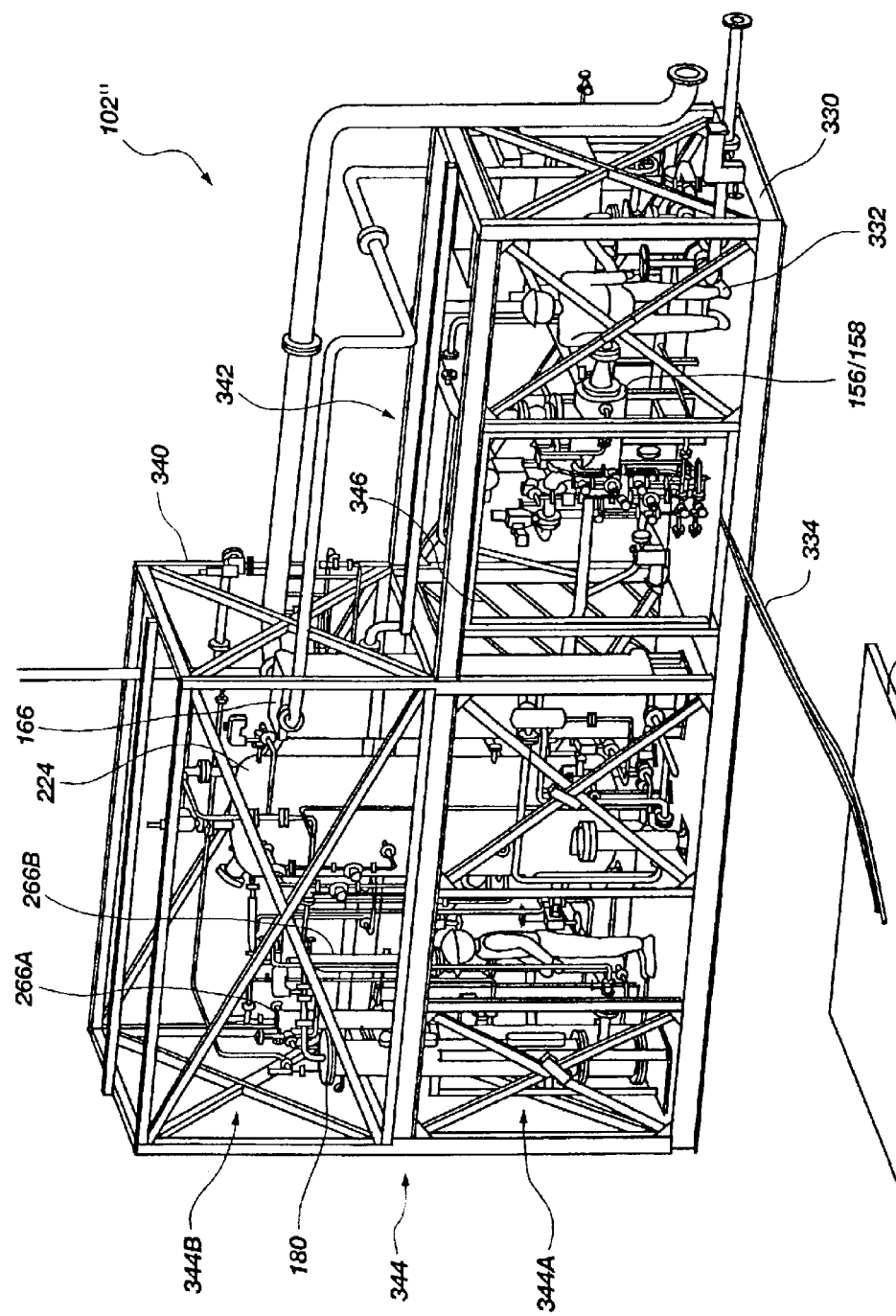
FIG. 13 is a perspective view of liquefaction plant according to one embodiment of the present invention.

Referring now to FIG. 13, an exemplary physical configuration of plant 102'' described in reference to FIG. 4 is according to one embodiment thereof. Plant 102'' is shown without siding or a roof for viewability. Substantially an entire plant 102'' may be mounted on a supporting structure such as a skid 330 such that the plant 102'' may be moved and transported as needed. Pointing out some of the major components of the plant 102'', the turbo expander 156/compressor 158 is shown on the right hand portion of the skid 330. A human operator 332 is shown next to the turbo expander 156/compressor 158 to provide a general frame of reference regarding the size of the plant 102''. Generally, the overall plant may be configured, for example, to be approximately 30 feet long, 17 feet high and 8 ½ feet wide. However, the overall plant may be sized smaller or larger as desired.

The high efficiency heat exchanger 166 and the heat exchanger 224 used for sublimation of solid $CO_2$ are found on the left hand side of the skid 330. The parallel $CO_2$ filters 266A and 226B can be seen adjacent heat exchanger 224. Wiring 334 may extend from the skid 330 to a remote location, such as a separate pad 335 or control room, for controlling various components, such as, for example, the turbo expander 156/compressor 158, as will be appreciated and understood by those of skill in the art. Additionally, pneumatic and/or hydraulic lines might extend from the skid 330 for control or external power input as may be desired. It is noted that by remotely locating the controls, or at least some of the controls, costs may be reduced as such remotely located controls and instruments need not have, for example, explosion proof enclosures or other safety features as would be required if located on the skid 330.

It is also noted that a framework 340 may be mounted on the skid 330 and configured to substantially encompass the plant 102''. A first section 342, exhibiting a first height, is shown to substantially encompass the volume around the turbo expander 156 and compressor 158. A second section 344 substantially encompasses the volume around the heat exchangers 166, 224, filters 266A and 266B and other components which operate at reduced temperatures. The second section 344 includes two subsections 344A and 344B with subsection 344A being substantially equivalent in height to section 342. Subsection 344B extends above the height of section 342 and may be removable for purposes of transportation as discussed below. The piping associated with the plant 102'' may be insulated for purposes minimizing unwanted heat transfer. Alternatively, or in combination with insulated pipes and selected components, an insulated wall 346 may separate section 342 from section 344 and from the external environs of the plant 102''. Additionally, insulated walls may be placed on the framework 340 about the exterior of the plant 102'' to insulate at least a portion of the plant 102'' from ambient temperature conditions which might reduce the efficiency of the plant 102''. Furthermore, various components may be individually insulated in addition to interconnecting piping, including but not limited to, separation tank 180, filter modules 266A, B, and heat exchangers 166 and 224.

Figure 14:
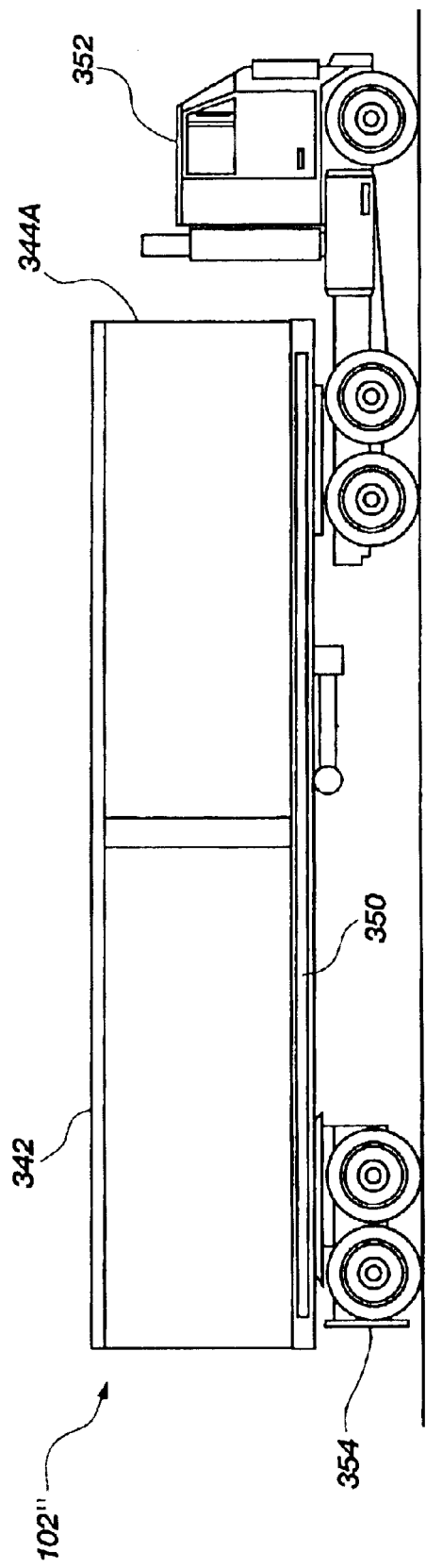
FIG. 14 shows the liquefaction plant of FIG. 4 in transportation to a plant site.

Referring now to FIG. 14, the plant 102'', or a substantial portion thereof, may, for example, be loaded onto a trailer 350 to be transported by truck 352 to a plant site. Alternatively, the supporting structure may serve as the trailer with the skid 330 configured with wheels, suspension and a hitch to mount to the truck tractor 352 at one end, and a second set of wheels 354 at the opposing end. Other means of transport will be readily apparent to those having ordinary skill in the art.

It is noted that upper subsection 344B has been removed, and, while not explicitly shown in the drawing, some larger components such as the high efficiency heat exchanger 166 and the solid $CO_2$ processing heat exchanger 224 have been removed. This potentially allows the plant to be transported without any special permits (i.e., wide load, oversized load, etc.) while keeping the plant substantially intact.

It is further noted that the plant may include controls such that minimal operator input is required. Indeed, it may be desirable that any plant 102–102'''' function without an onsite operator. Thus, with proper programming and control design, the plant may be accessed through remote telemetry for monitoring and/or adjusting the operations of the plant. Similarly, various alarms may be built into such controls so as to alert a remote operator or to shut down the plant in an upset condition. One suitable controller, for example, may be a DL405 series programmable logic controller (PLC) commercially available from Automation Direct of Cumming, Ga.

While the invention has been disclosed primarily in terms of liquefaction of natural gas, it is noted that the present invention may be utilized simply for removal of gas components, such as, for example, $CO_2$ from a stream of relatively "dirty" gas. Additionally, other gases may be processed and other gas components, such as, for example, nitrogen, may be removed. Thus, the present invention is not limited to the liquefaction of natural gas and the removal of $CO_2$ therefrom.

EXAMPLE

Figure 15:
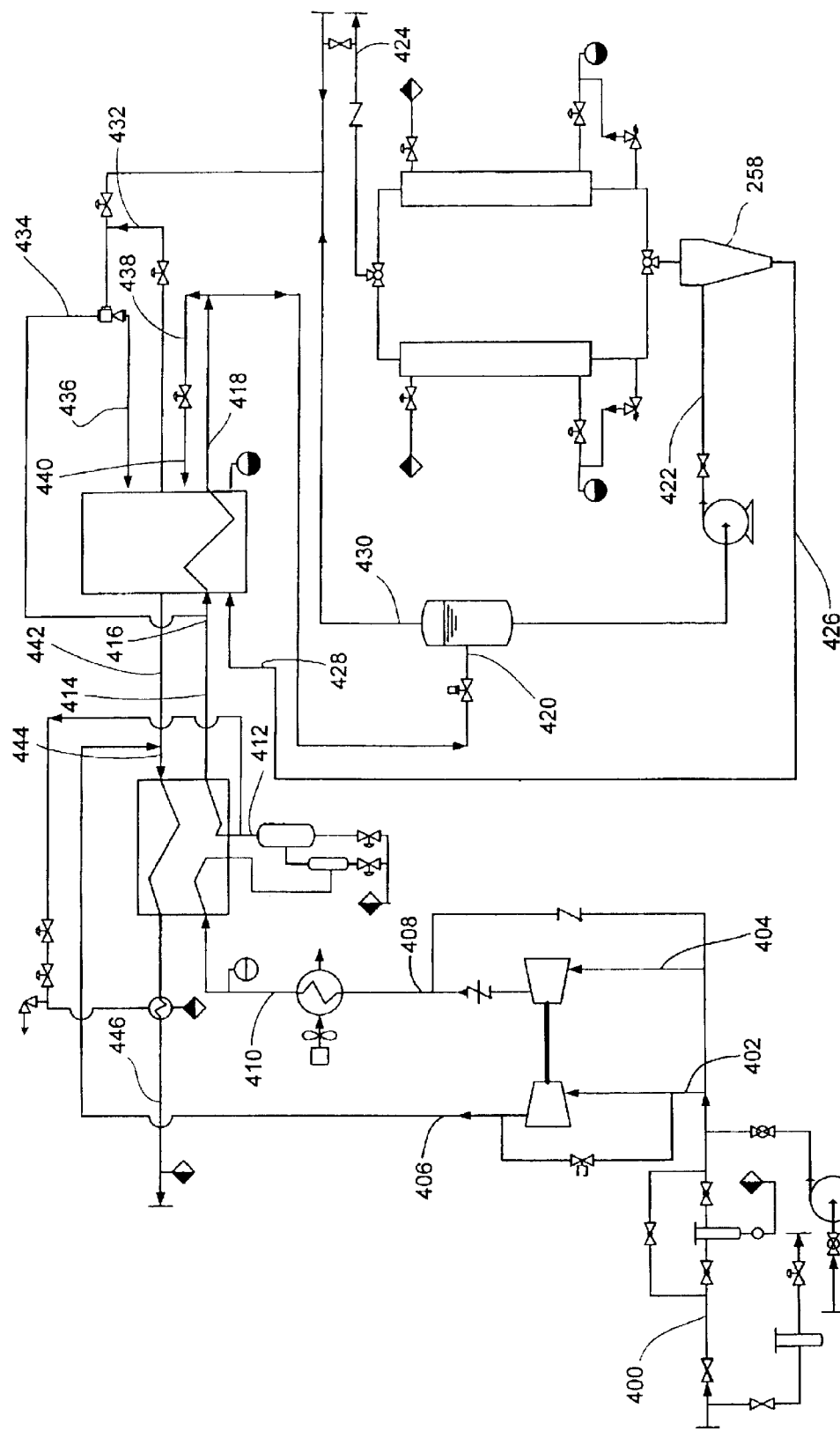
FIG. 15 is a process flow diagram showing state points of the flow mass throughout the system according to one embodiment of the present invention.

Referring now to FIGS. 4 and 15, an example of the process carried out in the liquefaction plant 102" is set forth. It is noted that FIG. 14 is the same process flow diagram as FIG. 4 (combined with the additional components of FIG. 3—e.g. the compressor 154 and expander 156 etc.) but with component reference numerals omitted for clarity. As the general process has been described above with reference to FIG. 4, the following example will set forth exemplary conditions of the gas/liquid/slurry at various locations throughout the plant, referred to herein as state points, according to the calculated operational design of the plant 102".

At state point 400, as the gas leaves distribution pipeline and enters the liquefaction plant the gas will be approximately 60° F. at a pressure of approximately 440 psia with a flow of approximately 10,00 lbm/hr.

At state points 402 and 404, the flow will be split such that approximately 5,065 lbm/hr flows through state point 402 and approximately 4,945 lbm/hr flows through state point 404 with temperatures and pressures of each state point being similar to that of state point 400.

At state point 406, as the stream exits the turboexpander 156, the gas will be approximately −104° F. at a pressure of approximately 65 psia. At state point 408, as the gas exits the compressor 158, the gas will be approximately 187° F. at a pressure of approximately 770 psia.

At state point 410, after the first heat exchanger 220 and prior to the high efficiency heat exchanger 166, the gas will be approximately 175° F. at a pressure of approximately 770 psia. At state point 412, after water clean-up and about midway through the high efficiency heat exchanger 166, the gas will be approximately −70° F. at a pressure of approximately 766 psia and exhibit a flow rate of approximately 4,939 lbm/hr.

The gas exiting the high efficiency heat exchanger 166, as shown at state point 414, will be approximately −105° F. at a pressure of approximately 763 psia.

The flow through the product stream 172' at state point 418 will be approximately −205° F. at pressure of approximately 761 psia with a flow rate of approximately 3,735 lbm/hr. At state point 420, after passing through the Joule-Thomson valve, and prior to entering the separator 180, the stream will become a mixture of gas, liquid natural gas, and solid $CO_2$ and will be approximately −240° F. at a pressure of approximately 35 psia. The slurry of solid $CO_2$ and liquid natural gas will have similar temperatures and pressures as it leaves the separator 180, however, it will have a flow rate of approximately 1,324 lbm/hr.

At state point 422, the pressure of the slurry will be raised, via the pump 260, to a pressure of approximately 114 psia and a temperature of approximately −236° F. At state point 424, after being separated via the hydrocyclone 258, the liquid natural gas will be approximately −240° F. at a pressure of approximately 35 psia with a flow rate of approximately 1,059 lbm/hr. The state of the liquid natural gas will remain substantially the same as it exits the plant 102" into a storage vessel.

At state point 426 the thickened slush (including solid $CO_2$) exiting the hydrocyclone 258 will be approximately −235° F. at a pressure of approximately −68.5 psia and will flow at a rate of approximately 265 lbm/hr.

At state point 430, the gas exiting the separator 180 will be approximately 240° F. at a pressure of approximately 35 psia with a flow rate of approximately 263 lbm/hr.

At state point 434, the gas in the motive stream entering into the eductor will be approximately −105° F. at approximately 764 psia. The flow rate at state point 434 will be approximately 1,205 lbm/hr. At state point 436, subsequent the eductor, the mixed stream will be approximately −217° F. at approximately 70 psia with a combined flow rate of approximately 698 lbm/hr.

At state point 438, prior to JT valve 174', the gas will be approximately −205° F. at a pressure of approximately 761 psia with a flow rate of approximately 2,147 lbm/hr. At state point 440, after passing through JT valve 174' whereby solid $CO_2$ is formed, the slurry will be approximately −221° F. with a pressure of approximately 68.5 psia.

At state point 442, upon exiting heat exchanger 224, the temperature of the gas will be approximately −195° F. and the pressure will be approximately 65 psia. The flow rate at state point 442 will be approximately 3,897 lbm/hr. At state point 444, after combining two streams, the gas will have a temperature of approximately −151° F. and a pressure of approximately 65 psia.

At state point 446, upon exit from the high efficiency heat exchanger 166, and prior to discharge into the pipeline 104, the gas will have a temperature of approximately 99° F. and a pressure of approximately 65 psia. The flow rate at state point 446 will be approximately 8,962 lbm/hr.

In light of the above disclosure it will be appreciated that the liquefaction process depicted and described herein provides for low cost, efficient and effective means of producing LNG without the requisite "purification" of the gas before subjecting the gas to the liquefaction cycle. Such allows the use of relatively "dirty" gas typically found in residential and industrial service lines, and eliminates the requirement for expensive pretreatment equipment and provides a significant reduction in operating costs for processing such relatively "dirty" gas.

While the invention may be susceptible to various modifications and alternative forms, specific embodiments which have been shown by way of example in the drawings and have been described in detail herein, it should be understood that the invention is not intended to be limited to the particular forms disclosed. Rather, the invention includes all modifications, equivalents, and alternatives falling within the spirit and scope of the invention as defined by the following appended claims.

We claim:

1. A heat exchanger comprising:
   a tank;
   at least two coils sequentially coupled to each other, the at least two coils being disposed in the tank such that their exterior surfaces are exposed to a common volume defined within the tank;
   at least one coil inlet configured to admit a first stream through at least one of the at least two coils;

a plurality of coil outlets configured to pass the first stream from the coils;

at least two tank inlets configured to flow a second stream through the tank, each of the at least two tank inlets being positioned proximate a corresponding coil of the at least two coils to cause the second stream to flow over at least the coil with which the respective tank inlet is positioned proximately; and a tank outlet configured to remove the second stream from the tank and wherein the heat exchanger is configured such that the first stream may be selectively flowed through a desired number of the at least two coils and such that the second stream may be substantially simultaneously flowed over the same coils through which the first stream is selectively flowed.

2. The heat exchanger of claim 1 wherein the heat exchanger is configured such that the first stream may be selectively flowed through only one coil of the at least two coils and such that the second stream may be selectively flowed over only one coil of the at least two coils substantially simultaneously.

3. The heat exchanger of claim 1, wherein the tank is configured as a pressure vessel.

4. The heat exchanger of claim 1, wherein the tank comprises stainless steel.

5. The heat exchanger of claim 1, wherein the at least two coils comprise stainless steel.

6. The heat exchanger of claim 1, further comprising at least one flow diverter positioned in a flow path of the first stream wherein the flow diverter assists in defining which coils of the desired number of coils the first stream will flow through.

7. The heat exchanger of claim 6, wherein the at least one flow diverter comprises at least one plug.

8. The heat exchanger of claim 7, wherein the at least one plug comprises a body having a first set of external threads and a keyed head configured to cooperatively mate with an installation tool.

9. The heat exchanger of claim 7, wherein the at least one plug further comprises a set of internal threads formed in the keyed head.

10. The heat exchanger of claim 6, wherein the at least one flow diverter comprises a valve.

11. The heat exchanger of claim 6, wherein the at least one flow diverter comprises a blind flange.

12. The heat exchanger of claim 1, wherein the at least two coils comprises a first coil, a second coil and a third coil.

13. A heat exchanger comprising:

a tank having a plurality of tank inlets and at least one tank outlet; and at least two cooling coils disposed within the tank coupled together in series and configured such that a first stream may be selectively flowed through one or more of the at least two coils, wherein at least one of the plurality of tank inlets of the plurality, is associated with each of the at least two cooling coils and configured such that a second stream may be selectively flowed through one or more tank inlets and over each of the one or more of the at least two coils to correspond with the selective flow of the first stream.

14. The heat exchanger of claim 13, wherein a first coil of the at least two coils is disposed at a first elevation and wherein a second coil of the at least two coils is disposed at a second elevation different from the first elevation.

15. The heat exchanger of claim 13, wherein the at least two coils includes a first coil, a second coil and a third coil and positioned and configured such that the second stream may be selectively flowed over the first coil, over the second coil and the first coil in a cascading arrangement, or over the third coil, the second coil and the first coil in a cascading arrangement.

16. The heat exchanger of claim 15, wherein the one or more tank inlets comprises a first plurality of tank inlets associated with the first coil, a second plurality of tank inlets associated with the second coil and a third plurality of tank inlets associated with the third coil.

17. The heat exchanger of claim 1, wherein a first coil of the at least two coils is disposed at a first elevation and wherein a second coil of the at least two coils is disposed at a second elevation different from the first elevation.

18. The heat exchanger of claim 17, wherein the at least one tank inlet is located and configured to direct the second stream over each of the at least two coils in a cascading arrangement.

19. The heat exchanger of claim 12, wherein the at least two tank inlets includes at least three tank inlets including at least a first tank inlet associate with the first coil, at least a second tank inlet associated with the second coil and at least a third tank inlet associated with the third coil and, wherein the at least a second tank inlet is located and configured to direct the second stream over each of the second coil and first coil in a cascading arrangement and, wherein the at least a third tank inlet is located and configured to direct the second stream over each of the third coil, the second coil and the first coil in a cascading arrangement.

20. A heat exchanger comprising:

a tank;

at least two coils disposed in the tank;

at least one coil inlet configured to admit a first stream through at least one of the at least two coils;

a plurality of coil outlets configured to pass the first stream from the coils;

at least two tank inlets configured to flow a second stream through the tank, each of the at least two tank inlets being positioned proximate a corresponding coil of the at least two coils to cause the second stream to flow over at least the coil with which the respective tank inlet is positioned proximately;

a tank outlet configured to remove the second stream from the tank and wherein the heat exchanger is configured such that the first stream may be selectively flowed through a desired number of the at least two coils and such that the second stream may be substantially simultaneously flowed over the same coils through which the first stream is selectively flowed;

at least one flow diverter positioned in a flow path of the first stream wherein the flow diverter assists in defining which coils of the desired number of coils the first stream will flow through, wherein the at least one flow diverter comprises at least one plug having a body, a first set of external threads and a keyed head configured to cooperatively mate with an installation tool.

* * * * *